United States Patent
Yun

(10) Patent No.: US 10,222,948 B2
(45) Date of Patent: Mar. 5, 2019

(54) MULTIMEDIA DEVICE AND CONTROL METHOD THEREFOR

(71) Applicant: LG ELECTRONICS INC., Seoul (KR)

(72) Inventor: Jaesun Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 79 days.

(21) Appl. No.: 15/531,851

(22) PCT Filed: Feb. 6, 2015

(86) PCT No.: PCT/KR2015/001213
§ 371 (c)(1),
(2) Date: May 31, 2017

(87) PCT Pub. No.: WO2016/088938
PCT Pub. Date: Jun. 9, 2016

(65) Prior Publication Data
US 2017/0269801 A1 Sep. 21, 2017

(30) Foreign Application Priority Data
Dec. 4, 2014 (KR) .................... 10-2014-0173121

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/048* (2013.01); *G06F 3/04817* (2013.01); *G06F 3/14* (2013.01);
(Continued)

(58) Field of Classification Search
CPC ......... H04N 5/4403; H04N 2005/4412; H04N 21/4312; G06F 3/048; G06F 3/04817; G06F 3/0482; G06F 3/14
See application file for complete search history.

(56) References Cited

U.S. PATENT DOCUMENTS 6,020,929 A * 2/2000 Marshall ............ H04N 5/44543
345/629
8,756,502 B2 * 6/2014 Hill ........................ G06F 3/0481
715/702
(Continued)

FOREIGN PATENT DOCUMENTS

KR 10-2001-0052396 A 6/2001
KR 10-2014-0125211 A 10/2014

OTHER PUBLICATIONS

Michel et al.; customized Television: Standards Compliant Advanced Digital Telecisionl; IEEE; 2002; 8 pages.*
(Continued)

*Primary Examiner* — Linh K Pham
(74) *Attorney, Agent, or Firm* — Birch, Stewart, Kolasch & Birch, LLP

(57) ABSTRACT

Disclosed are a multimedia device and a control method therefor. A multimedia device according an embodiment of the present invention may comprise: a display unit; and a control unit for controlling the display unit to display a menu bar on a screen, wherein the menu bar includes a plurality of icons arranged in one direction, and the icons adjacent to each other are displayed while partially overlapping each other. A multimedia device according to another embodiment of the present invention may comprise: a display unit; and a control unit for controlling the display unit to display a menu bar on a screen, wherein the menu bar includes a plurality of icons arranged in one direction, and the control unit sets a fixed area by fixing at least one icon included in
(Continued)

the menu bar by a fixing frame, and separates the menu bar into the fixed area and a variable area according to whether the fixing frame exists.

14 Claims, 22 Drawing Sheets

(51) Int. Cl.
*G06F 3/14* (2006.01)
*G06F 3/0481* (2013.01)
*H04N 21/431* (2011.01)
*H04N 21/482* (2011.01)

(52) U.S. Cl.
CPC ....... *H04N 21/4314* (2013.01); *H04N 21/482* (2013.01)

(56) References Cited

U.S. PATENT DOCUMENTS

| | | | | |
|---|---|---|---|---|
| 2003/0112224 | A1* | 6/2003 | Pan | G06F 3/018 345/171 |
| 2007/0124675 | A1* | 5/2007 | Ban | G06F 9/454 715/703 |
| 2007/0150828 | A1* | 6/2007 | Tsukada | G06F 17/30058 715/777 |
| 2008/0062127 | A1* | 3/2008 | Brodersen | G06F 3/0482 345/158 |
| 2008/0184303 | A1* | 7/2008 | Schein | G06F 3/0481 725/40 |
| 2009/0204929 | A1 | 8/2009 | Baurmann et al. | |
| 2010/0153997 | A1* | 6/2010 | Baumgartner | H04N 5/44543 725/39 |
| 2010/0287494 | A1 | 11/2010 | Ording | |
| 2011/0047568 | A1 | 2/2011 | Yeh et al. | |
| 2011/0179451 | A1* | 7/2011 | Miles | H04N 5/445 725/42 |
| 2011/0283325 | A1 | 11/2011 | Tomita | |
| 2012/0054176 | A1* | 3/2012 | Chung | G06F 17/30716 707/722 |
| 2013/0185642 | A1* | 7/2013 | Gammons | G06F 3/0482 715/733 |
| 2014/0039872 | A1* | 2/2014 | Patel | G06F 9/454 704/2 |
| 2014/0053192 | A1* | 2/2014 | Sirpal | G06F 3/017 725/37 |
| 2014/0053204 | A1* | 2/2014 | Milano | G06F 3/017 725/46 |
| 2014/0143812 | A1 | 5/2014 | Smith et al. | |
| 2014/0310742 | A1* | 10/2014 | Kim | H04N 21/485 725/30 |
| 2015/0067729 | A1* | 3/2015 | Yoon | G06F 3/0482 725/37 |
| 2015/0189383 | A1* | 7/2015 | Saijo | H04N 21/4668 725/14 |

OTHER PUBLICATIONS

Lee et al., Actual remote control: a universal remote control using hand motions on a virtual menu; IEEE, Aug. 2009; 8 pages.*
Kim et al., Smart TV usage extension method using screen division and virtual network computing; IEEE; 2014; 5 pages.*

* cited by examiner

MULTIMEDIA DEVICE AND CONTROL METHOD THEREFOR

CROSS REFERENCE TO RELATED APPLICATIONS

This application is the National Phase of PCT International Application No. PCT/KR2015/001213, filed on Feb. 6, 2015, which claims priority under 35 U.S.C. 119(a) to Patent Application No. 10-2014-0173121, filed in Republic of Korea on Dec. 4, 2014, all of which are hereby expressly incorporated by reference into the present application.

TECHNICAL FIELD

The present invention relates to a multimedia device and a control method therefor.

BACKGROUND ART

Mobile devices such as a smart phone and a tablet PC have been remarkably developed subsequently to the development of standing devices such as a personal computer (PC) and a television (TV). Although the standing devices and the mobile devices have been developed in their respective fields, their respective fields become ambiguous in accordance with a boom of digital convergence.

Meanwhile, a TV has been implemented as a multimedia device having complex functions such as a computer support function and Internet function in addition to a broadcast receiving function. However, in this multimedia device, a discussion as to how a user environment for allowing each user to access various functions more conveniently will be provided still remains.

DISCLOSURE

Technical Problem

An object of the present invention is to solve the above-noted and other problems. Another object of the present invention is to provide a multimedia device and a control method therefor, in which a menu bar including a plurality of icons is provided, and an arrangement order, position and overlap width of the icons may be varied to provide convenience to a user.

Other object of the present invention is to provide a multimedia device and a control method therefor, in which a user environment for allowing a user to easily access functions of the multimedia device is provided.

The technical objects that can be achieved through the present invention are not limited to what has been particularly described hereinabove and other technical objects not described herein will be more clearly understood by persons skilled in the art from the following detailed description.

Technical Solution

A multimedia device according to one embodiment of the present invention comprises a display unit; and a controller for controlling the display unit to display a menu bar on a screen, wherein the menu bar includes a plurality of icons arranged in one direction, and the icons adjacent to each other are displayed while partially overlapping each other.

A multimedia device according to another embodiment of the present invention comprises a display unit; and a controller for controlling the display unit to display a menu bar on a screen, wherein the menu bar includes a plurality of icons arranged in one direction, and the controller sets a fixed area by fixing at least one icon included in the menu bar using a fixing frame, and divides the menu bar into the fixed area and a variable area depending on the presence of the fixing frame.

It will be appreciated by persons skilled in the art that that the technical solutions that could be achieved with the present invention are not limited to what has been particularly described hereinabove and other technical solutions of the present invention will be more clearly understood from the following detailed description.

Advantageous Effects

Advantages effects of a multimedia device and a control method therefor according to the present invention are as follows.

At least one of the embodiments of the present invention, a menu bar including a plurality of icons is provided, and an arrangement order, position and overlap width of the icons may be varied to provide convenience to a user.

At least one of the embodiments of the present invention, at least one icon included in the menu bar is fixed to a fixing frame to set a fixed area, and the menu bar is divided into a fixed area and a variable area depending on the presence of the fixing frame, whereby convenience may be provided to a user.

At least one of the embodiments of the present invention, a user environment for allowing a user to easily access functions of the multimedia device may be provided.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Figure 1:
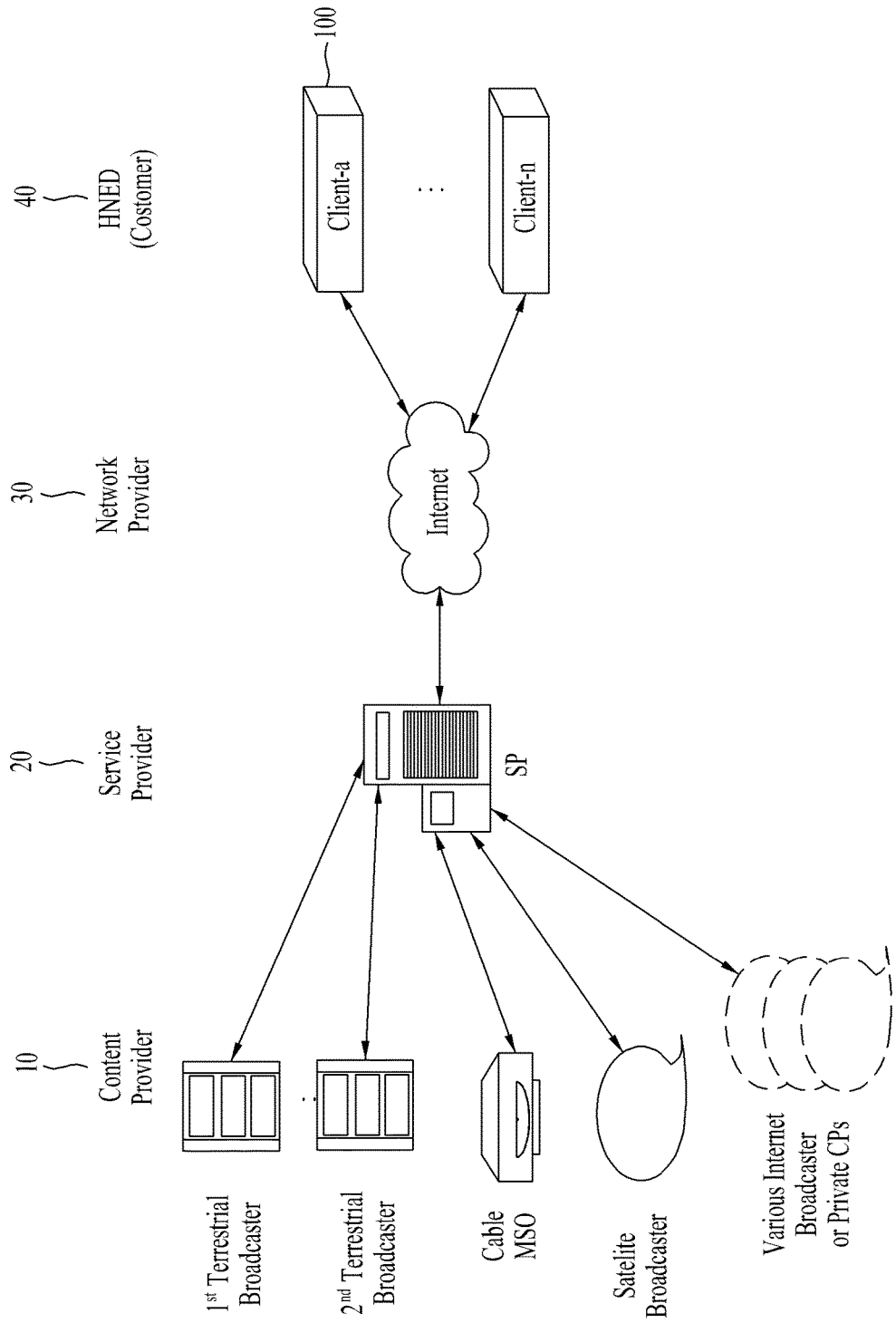
FIG. 1 is a diagram briefly illustrating a service system including a digital device according to one embodiment of the present invention.

Hereinafter, various embodiment(s) of a multimedia device and a control method therefor according to the present invention will be described in detail with reference to the accompanying drawings.

In general, a suffix such as "module" and "unit" can be used to refer to elements or components. Use of such a suffix herein is merely intended to facilitate description of the specification, and the suffix itself is not intended to give any special meaning or function. Meanwhile, such an ordinal number as 'first, 'second', 'third' and the like can have a meaning of an order. Yet, the terminologies can be used for the purpose of distinguishing one component from another component capable of being overlapped with each other. In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings.

As such, the present disclosure should be construed to extend to any alterations, equivalents and substitutes in addition to those which are particularly set out in the accompanying drawings.

A digital device according to the present invention as set forth herein can be any device that can handle any one of transmitting, receiving, handling and outputting data, content, servicer, application, and so forth. The digital device can be connected to other digital devices through wired network or wireless network, paired or connected to external server, and through the connections, the digital device can transmit and receive the prescribed data. Examples of the digital device can include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), smart phone, tablet PC, or Notebook computer. For convenience of description, in this specification, Digital TV is used in FIG. 2 and mobile device is used in FIG. 3 depicting the digital device. Further, the digital device in this specification can be referred to configuration having only a panel, set-top box (STB), or a set including the entire system.

Moreover, the wired or wireless network described in this specification can refer to various pairing method, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN)(Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In addition, when this specification refers simply to the digital device, it can mean a standing device or a mobile device depending on the context, and when it is not referred to a specific device, the digital device referred in this specification refers to both standing and mobile device.

Meanwhile, the digital device can perform intelligent functions such as receiving broadcasting program, operating computer functions, and supporting at least one external input, and by being connected through the network wired or wirelessly, the digital device can support e-mail functions, web browsing functions, banking, gaming, and executing applications. The digital device can further include an interface for any one of input or control means (hereinafter referred as "input means") supporting handwriting input, touch-screen, and space remote control.

Furthermore, the digital device can use standard operating system (OS), however, the digital device described in this specification and the embodiments, uses Web OS. Therefore, the digital device can perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input means or digital devices, capable of transmitting and receiving data through wired or wireless network connected to and from the digital device. For example, the external input includes High Definition Multimedia Interface (HDMI), game devices such as playstation or X-Box, smart phone, tablet PC, printing device such as pocket photo, digital devices such as smart TV and blue-ray device.

The "server" referred to as in this application, includes digital device or system capable of transmitting and receiving data to and from client, and can also be referred to as a processor. For example, the server can be servers providing services such as portal server providing web page, web content or web service, advertising server providing advertising data, content server, Social Network Service (SNS) server providing SNS service, service server providing service to manufacturer, Multichannel Video Programming Distributor (MVPD) providing Vide on Demand or streaming service, and service server providing pay services.

In this application, when application is described for the convenience of explanation, the meaning of application in the context can include services as well as applications.

In the following description, various embodiments according to the present invention are explained with reference to attached drawings.

FIG. 1 illustrates a broadcast system including a digital receiver according to an embodiment of the present invention.

Referring to FIG. 1, examples of a broadcast system comprising a digital receiver may include a content provider (CP) 10, a service provider (SP) 20, a network provider (NP) 30, and a home network end user (HNED) (Customer) 40. The HNED 40 includes a client 100, that is, a digital receiver.

The CP 10 is an entity that produces content. Referring to FIG. 1, the CP 10 can include a 1st or 2nd terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

Each of the CP 10, SP 20 and NP 30, or a combination thereof may be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

Figure 2:
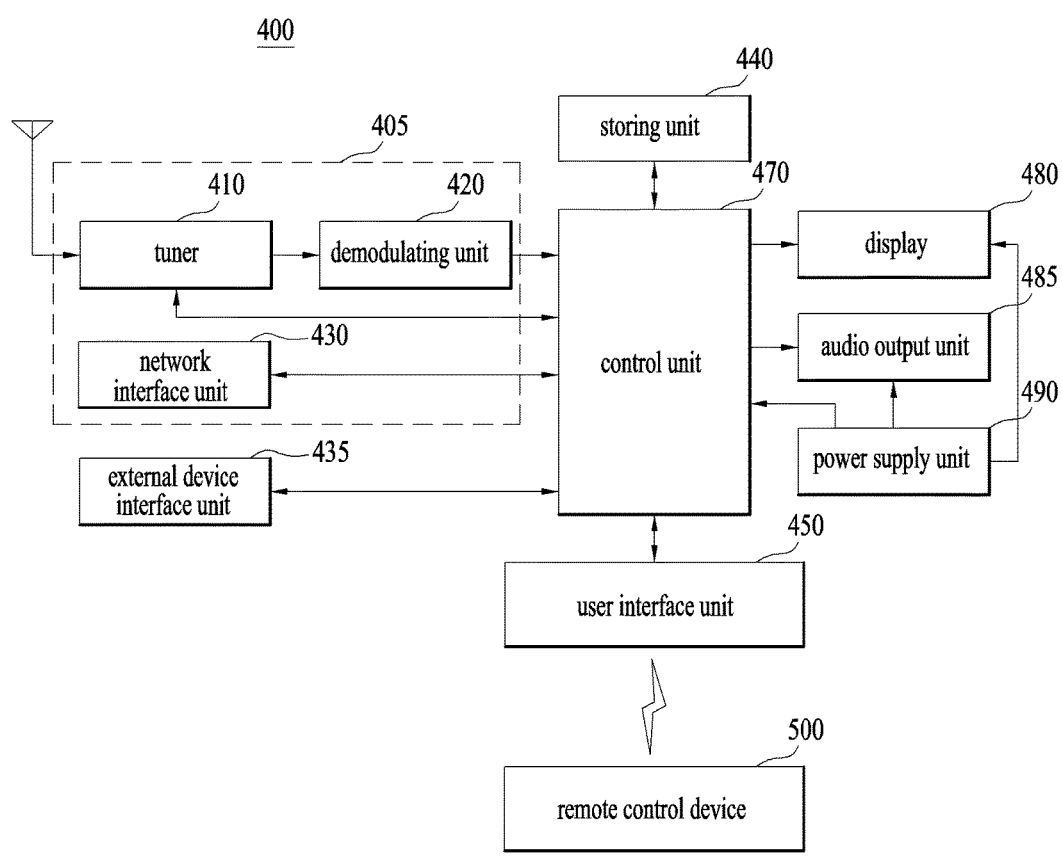
FIG. 2 is a schematic block diagram illustrating a digital device according to another embodiment of the present invention.
Figure 3:
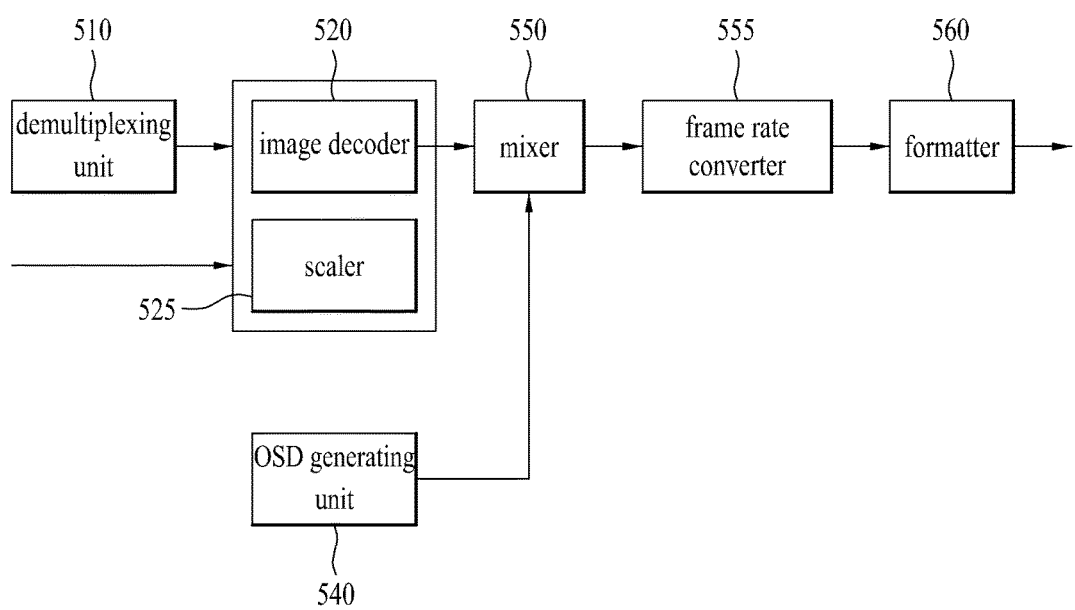
FIG. 3 is a schematic block diagram illustrating a detailed configuration of a controller shown in FIG. 2 in accordance with one embodiment of the present invention.

FIG. 2 illustrates a digital receiver according to another embodiment of the present invention.

Referring to FIG. 2, an exemplary digital receiver 400 according to the present invention may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 may include at least one of one or more tuner 410, a demodulator 420, and a network interface 430. The broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning to a channel selected by the user from among RF broadcast signals received through an antenna or all previously stored channels. Also, the tuner 410 may convert the received RF broadcast signal to an IF (Intermediate Frequency) signal or a baseband signal.

For example, if the received RF broadcast signal is a digital broadcast signal, the RF broadcast signal is converted to the IF (Intermediate Frequency) signal. Also, if the received RF broadcast signal is an analog broadcast signal, the RF broadcast signal is converted to an analog baseband video or audio signal (CVBS/SIF).

Also, the tuner 410 may receive the radio frequency (RF) broadcast signal of a single carrier or multiple carriers.

The demodulator 420 may receive a digital IF (Intermediate Frequency) signal (DIF) converted by the tuner 410 and demodulate the DIF signal.

The demodulator 420 may output a stream signal (TS) after processing demodulation and channel decoding.

A stream signal output from the demodulator 420 may be input to the controller 470. The controller 470 can control demultiplexing, audio/video signal processing, etc. Furthermore, the controller 470 can control output of an image through the display unit 480 and output of audio through the audio output unit 485.

The external device interface 435 may provide an environment for interfacing external devices with the digital receiver 400. To implement this, the external device interface 435 may include an A/V input/output unit (not shown) or an RF communication unit (not shown).

The external device interface 435 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital receiver 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

Also, the external device interface 435 can be connected with a settop-box (STB) in a wired/wireless manner.

The external device interface 435 can receive applications or an application list from the adjacent external devices, and transmit to the controller 470 or the storage unit 440.

The network interface 430 may provide an interface for connecting the digital receiver 400 to wired/wireless networks.

Using the network interface 430, the digital receiver can transmit/receive data to/from other users or other electronic apparatuses through a network connected thereto or another network linked to the connected network.

Also, using the network interface 430, the digital receiver can access a predetermined web page through a network connected thereto or another network linked to the connected network.

The network interface 430 can selectively receive a desired application from among publicly open applications through a network.

The storage unit 440 may store programs for signal processing and control and store a processed video, audio or data signal.

In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430.

The storage unit 440 may store various platforms which will be described later.

The storage unit 440 can include storage media of one or more types, such as a flash memory type, a hard disk type, a multimedia card micro type, a card type memory (e.g. SD or XD memory), RAM, EEPROM, etc. The digital receiver 400 may reproduce content files (a video file, a still image file, a music file, a text file, an application file, etc.) and provide them to the user.

While FIG. 2 illustrates an embodiment in which the storage unit 440 is separated from the controller 470, the configuration of the digital receiver 400 is not limited thereto and the storage unit 440 may be included in the controller 470.

The user input interface 450 may transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 may include a demultiplexer and an image processor, which are not shown in FIG. 2.

The controller 470 can control the overall operation of the digital receiver 300. For example, the controller 470 can control the tuner 410 to tune to an RF broadcast corresponding to a channel selected by the user or a previously stored channel.

The controller 470 can control the digital receiver 400 according to a user command input through the user input interface 450 or an internal program. Particularly, the controller 470 can control the digital receiver 400 to be linked to a network to download an application or application list that the user desires to the digital receiver 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital receiver 400, received broadcast content or content input from an external device. The content may include at least one of a broadcast image, an external input image, an audio file, a still image, an image of a linked web, and a text file.

The controller 470 can control display of applications or an application list, downloadable from the digital receiver 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital receiver 400 may further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals.

The display unit 480 may be a PDP, an LCD, an OLED, a flexible display, a 3D display or the like.

The display unit 480 may be configured as a touch-screen and used as an input device rather than an output device.

The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital receiver 400 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 470 through the user input interface 450.

The digital receiver 400 may further include the photographing unit (not shown) for photographing the user. Image information acquired by the photographing unit (not shown) can be supplied to the controller 470.

The controller 470 may sense a gesture of the user from an image captured by the photographing unit (not shown) or a signal sensed by the sensing unit (not shown), or by combining the image and the signal.

The power supply unit 490 may supply power to the digital receiver 400.

Particularly, the power supply unit 490 can supply power to the controller 470 which can be implemented as a system-on-chip (SoC), the display unit 480 for displaying images, and the audio output unit 485 for audio output.

Accordingly, the power supply unit 490 can include a converter converting an alternating current into a direct current.

The remote controller 500 may transmit user input to the user input interface 450. To achieve this, the remote controller 500 can use Bluetooth, RF communication, IR communication, UWB, ZigBee, etc.

In addition, the remote controller 500 can receive audio, video or data signal output from the user input interface 350 and display the received signal or output the same as audio or vibration.

The digital device 400 may a digital broadcast receiver for processing a digital broadcast signal of ATSC type or DVB type.

Also, in the digital device 400, some of the components may be omitted or a component may be added as required. The digital receiver according to the present invention may not include the tuner and the demodulator, differently from the digital receivers shown in FIG. 2, and may receive content through the network interface or the external device interface and reproduce the content.

FIG. 3 illustrates a digital receiver according to another embodiment of the present invention. Particularly, FIG. 3 shows a configuration for implementing a 3D digital receiver, which can be included in the configurations of FIG. 2.

The digital receiver according to the present invention may include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example.

The image processor 420 can process a demultiplexed image signal using a video decoder 525 and a scaler 535.

The video decoder 525 can decode the demultiplexed image signal and the scaler 535 can scale the resolution of the decoded image signal such that the image signal can be displayed.

The video decoder 525 can support various standards.

The image signal decoded by the image processor 520 may be input to the mixer 550.

The OSD generator 540 may generate OSD data automatically or according to user input. For example, the OSD generator 540 may generate data to be displayed on the screen of an output unit in the form of an image or text on the basis of a control signal of a user input interface. OSD data generated by the OSD generator 540 may include various data such as a user interface image of the digital receiver, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image.

The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The 3D formatter 560 may change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals.

Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal may be EPG information including broadcast information such as the start time and end time (or duration) of a broadcast program which is broadcast through each channel.

The digital receiver is exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention.

The digital receiver is an example of image signal processors which process an image stored therein or an input image. Other examples of the image signal processors may include a set-top box (STB) which does not include the display unit 380 and the audio output unit 485 shown in FIG. 2, a DVD player, a Blu-ray player, a game device, a computer, etc.

Figure 4:
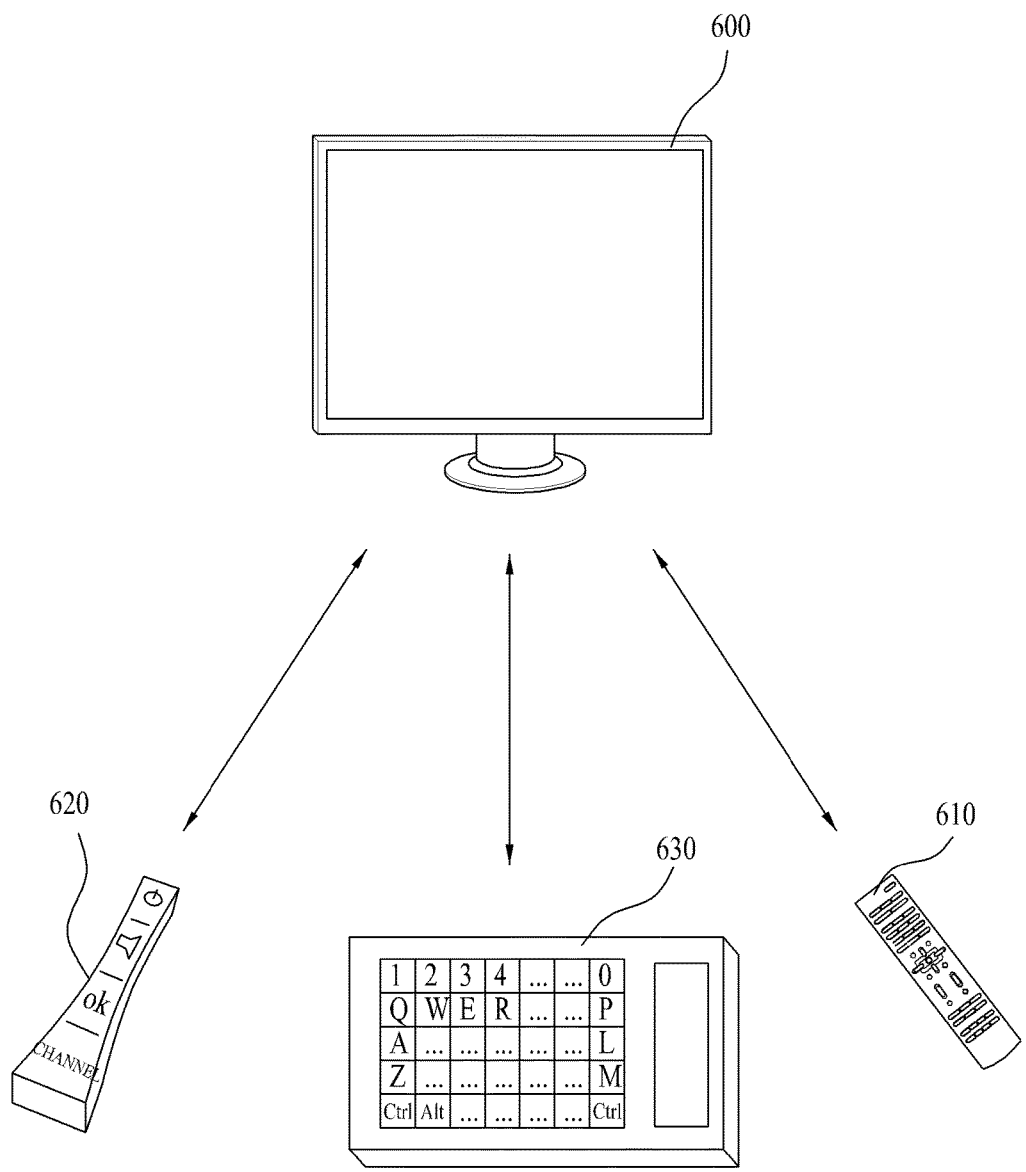
FIG. 4 is a diagram illustrating an input means connected with a digital device of FIGS. 2 and 3 according to one embodiment of the present invention.

FIG. 4 illustrates remote controllers of a digital receiver according to an embodiment of the present invention.

A front panel or a control unit (an input unit) on the digital device can use in order to control the digital device 600.

To execute various operations for implementing the present invention according to embodiments, various user interface devices (UIDs) which can communicate with a digital receiver 600 in a wired/wireless manner can be used as remote controllers.

The remote controllers can use various communication protocols such as Bluetooth, RFID, IrDA, UWB, ZigBee, DLNA, etc.

UIDs can include a mobile device (e.g., a smart phone, a tablet PC, and the like), a magic remote controller 620 and a remote controller 630 equipped with a keyboard and a touch pad in addition to a general remote controller 610.

The magic remote controller 620 may include a gyro sensor mounted therein to sense vibration of a user's hand or rotation. That is, the magic remote controller 620 can move a pointer according to up, down, left and right motions of the user such that the user can easily execute a desired action, for example, easily control a channel or a menu.

The remote controller 630 including the keyboard and touch pad can facilitate text input through the keyboard and control of movement of a pointer and magnification and reduction of a picture or video through the touch pad.

A general remote controller 610, a magic remote controller 620 and a remote controller 630 can include a touch pad. They can input a text and control of movement of a pointer and magnification and reduction of a picture or video through the touch pad.

The digital device described in the present specification can be operated by based on WebOS platform. Hereinafter, a WebOS based process or algorithm may be performed by the controller of the above-described digital device. The controller includes the controllers of FIGS. 2 to 3 and has wide concepts. Accordingly, hereinafter, a component for processing WebOS based services, applications, content, etc., including software, firmware or hardware in a digital device is referred to a controller.

Such a WebOS based platform may improve development independency and functional extensibility by integrating services, applications, etc. based on a Luna-service bus, for example, and increase application development productivity based on web application framework. In addition, system resources, etc. may be efficiently used via a WebOS process and resource management to support multitasking.

A WebOS platform described in the present specification may be available or loaded not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Hereinafter, the embodiments of the present invention will be described. Hereinafter, the embodiments of the present invention may be described and understood with reference to the description made with reference to FIGS. 1 to 4. Also, the aforementioned display device or digital device may be a multimedia device according to one embodiment of the present invention.

The multimedia device described in this specification may include a TV, a smart TV, a hybrid broadcast broadband television (HBBTV), a network TV, a web TV, an Internet protocol television (IPTV), a personal computer, a tablet PC, a notebook computer, netbook computer, a PMP, a smart phone, a smart watch, smart glasses, a navigator, etc.

Figure 5:
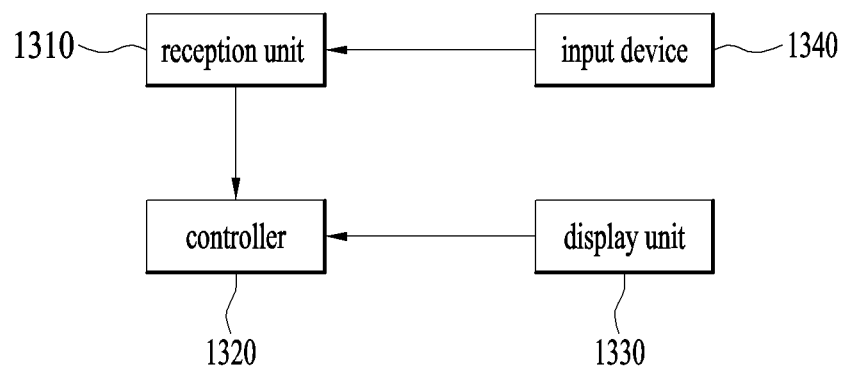
FIG. 5 is a block diagram illustrating component modules of a multimedia device according to one embodiment of the present invention.

FIG. 5 is a detailed block diagram illustrating component modules of a multimedia device according to another embodiment of the present invention. The multimedia device according to one embodiment of the present invention may include a reception unit 1310 for receiving a signal from an external input device 1340, a controller 1320, and a display unit 1330.

The reception unit 1310 may receive a broadcast signal including broadcast program data, content, etc. from a broadcasting station or content provider (CP), or may receive service, application, content, etc. from an external server through a network. The reception unit 1310 may receive a specific command from a user. Also, the reception unit 1310 may receive a control signal for controlling the multimedia device from the external input device 1340, or may receive a control signal for controlling the multimedia device through a touch screen if the display unit 1330 includes the touch screen. For example, the reception unit 1310 may receive a menu bar display signal from the input device 1340.

The display unit 1330 may display video data, graphic data, image data, etc., which correspond to the content received from the reception unit 1310. Also, the display unit 1330 may display video data, graphic data and image data, which are previously stored in the memory.

Subsequently, the controller 1320 controls the operation of the multimedia device, and manages whole functions of the reception unit 1310 and the display unit 1330. The controller 1320 may include a decoder for processing video data and audio data of the content received in the reception unit 1310.

According to one embodiment of the present invention, the controller 1320 may control the display unit 1330 to display a menu bar on the screen in accordance with the received menu bar display signal. This will be described with reference to FIG. 6.

Figure 6:
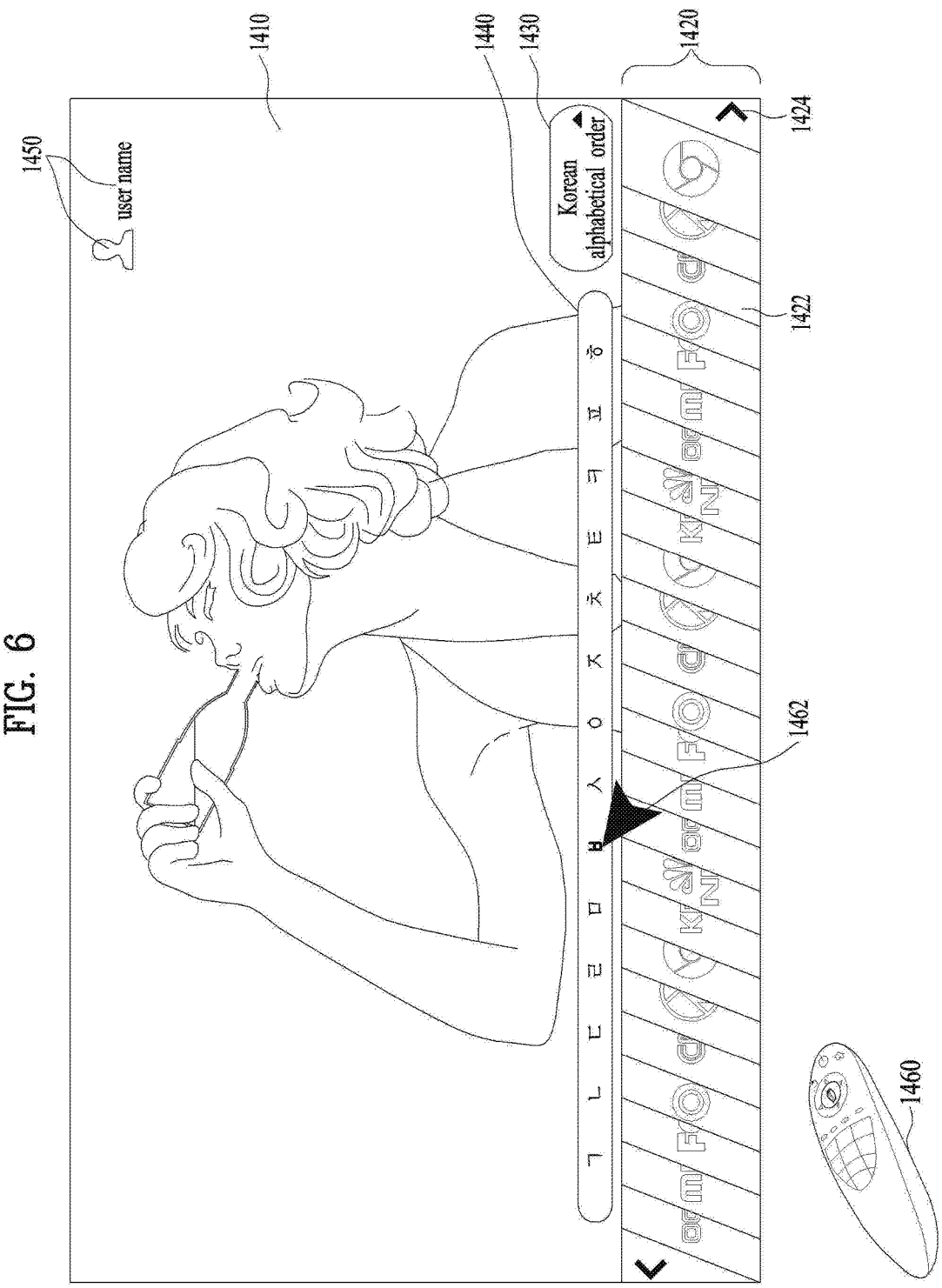
FIG. 6 is a diagram illustrating a method for displaying a menu bar in a multimedia device according to one embodiment of the present invention.

FIG. 6 is a diagram illustrating a method for displaying a menu bar in a multimedia device according to one embodiment of the present invention.

As shown in FIG. 6, the controller of the multimedia device controls the display unit to display the menu bar 1420 on the screen 1410 in accordance with the received menu bar display signal.

In case of log-in to an account of a specific user, the controller of the multimedia device may output the menu bar 1420 corresponding to the logged-in to account of the specific user and a name 1450 of the specific user onto the screen 1410 of the display unit.

For example, the menu bar 1420 may be displayed on any one of an upper end, a lower end, a left end and a right end of the screen of the display unit. For example, the menu bar 1420 may be displayed on the lower end of the screen 1410 on which a predetermined content is displayed.

Also, the log-in to account of a specific user means that an environment customized for a specific user may be provided in using the multimedia device.

The environment customized for a specific user may be set/changed by the specific user, and may be set/changed by the controller on the basis of a history of the multimedia device used by the specific user.

Therefore, the controller may automatically output the menu bar 1420 to the screen 1410 of the display unit after logging in to the account of the specific user, or may output the menu bar 1420 to the screen 1410 of the display unit if a predetermined signal for paging the menu bar 1420 is received from a remote controller 1460 after logging in to the account of the specific user.

In this case, the menu bar 1420 may be related to at least one of a channel designated as a preferred channel by a specific user, a channel having a history watched by a specific user for a predetermined time or more, an application having a history executed by a specific user for a predetermined number of times or more, a content recommended for a specific user, an application recommended for a specific user, and a channel recommended for a specific user.

As the case may be, the menu bar 1420 may include icons 1422 corresponding to each channel, each content and each application.

In this case, the icons 1422 included in the menu bar 1420 may have shapes such as card, tile, thumbnail and piece. For example, the icons 1422 of the menu bar 1420 may have a shape of App card for displaying emblem of an application to be executed.

Also, the menu bar 1420 may include a plurality of icons 1422 arranged in one direction, wherein the icons 1422 adjacent to each other may be displayed to be partially overlapped.

For example, the controller may control the display unit to display the icons 1422 by overlapping some areas of the icons 1422 adjacent to each other if the number of the icons 1422 is a predetermined reference number or more.

In this case, an overlap area of some areas of the icons 1422 adjacent to each other may be varied depending on the number of the icons 1422 included in the menu bar 1420.

For example, if the number of the icons 1422 included in the menu bar 1420 is increased, the overlap area of the icons 1422 adjacent to each other may be increased. If the number of the icons 1422 included in the menu bar 1420 is reduced, the overlap area of the icons 1422 adjacent to each other may be reduced.

Also, if all the icons 1422 included in the menu bar 1420 cannot be displayed on one screen or the menu bar 1420 includes a plurality of pages, the menu bar 1420 may further include an indicator 1424 for identifying the icons 1422 which are not displayed on one screen and/or the icons 1422 displayed on different pages.

For example, the indicator 1424 for scrolling the icons 1422 in a left and right direction may be displayed on both ends of the menu bar 1420.

If the indicator 1424 is selected by the remote controller 1460, the controller may scroll the icons 1422 in a left and right direction or output the menu bar 1420, which includes the icons 1422 belonging to another page constituting the menu bar 1420, onto the display unit.

Also, a main option UI button 1430, which includes a plurality of main options for setting an arrangement order of the icons 1422 of the menu bar 1420, and a sub option UI button 1440, which includes a sub option for categorizing the set main option in detail, may be arranged in the periphery of the menu bar 1420.

In this case, the controller may display the plurality of main options to adjoin the main option UI button if a cursor 1662 of the remote controller 1460 which is an input device is arranged in the main option UI button 1430.

If any one of the plurality of main options is selected, the controller may display the sub option UI button 1440 that includes a sub option corresponding to the selected main option.

Next, if the cursor 1462 of the remote controller 1460 selects a sub option, the controller may change the arrangement order of the icons 1422 of the menu bar 1420 in accordance with the selected sub option.

FIGS. 7 to 14 are diagrams illustrating a method for changing an arrangement order of icons included in a menu bar of FIG. 6.

Figure 7:
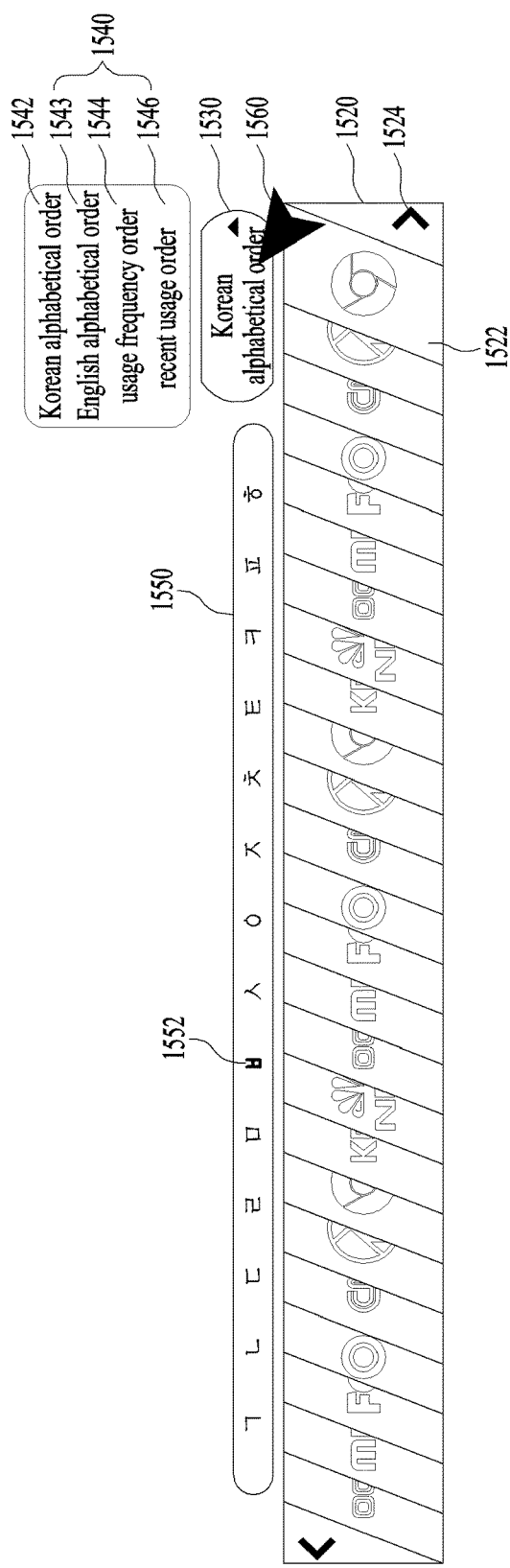
FIGS. 7 to 14 are diagrams illustrating a method for changing an arrangement order of icons included in a menu bar of FIG. 6.

As shown in FIG. 7, the controller controls the display unit to display the menu bar 1520 on the screen, wherein the menu bar 1520 may include a plurality of icons 1522 arranged in one direction, and the icons 1522 adjacent to each other may be displayed to be partially overlapped.

In this case, the controller may control the display unit to display the icons 1522 by overlapping some areas of the icons 1522 adjacent to each other if the number of the icons 1522 included in the menu bar 1520 is a predetermined reference number or more.

Also, a main option UI button 1530, which includes a plurality of main options 1540 for setting an arrangement order of the icons 1522 of the menu bar 1520, and a sub option UI button 1550, which includes a sub option 1552 for categorizing the set main option 1540 in detail, may be arranged in the periphery of the menu bar 1520.

For example, as shown in FIG. 7, the plurality of main options 1540 may include, but not limited to, a first main option 1542 for arranging the icons 1522 of the menu bar 1520 to allow a first letter of a text string to be listed in the order of the Korean alphabet, a second main option 1543 for arranging the icons 1522 of the menu bar 1520 to allow a first letter of a text string to be listed in the order of the English alphabet, a third main option 1544 for arranging the icons 1522 of the menu bar 1520 in the order of usage frequency, and a fourth main option 1546 for arranging the icons 1522 of the menu bar 1520 in the order of recent usage.

The sub option 1552 may include a first sub option for categorizing the first main option 1542 in detail to allow a first letter of a text string to be listed in Korean consonants, a second sub option for categorizing the second main option 1543 in detail to allow a first letter of a text string to be listed in alphabet capitals or small letters, a third sub option for categorizing the third main option 1544 into usage frequency in detail, and a fourth sub option for categorizing the fourth main option 1546 into usage date in detail.

Next, the controller may display the plurality of main options 1540 to adjoin the main option UI button 1530 if the cursor 1560 of the input device is arranged in the main option UI button 1530.

If any one of the plurality of main options 1540 is selected, the controller may display the sub option UI button 1550 that includes a sub option 1552 corresponding to the selected main option 1540.

Subsequently, if the cursor 1560 of the input device selects the sub option 1552, the controller may change the arrangement order of the icons 1522 of the menu bar 1520 in accordance with the selected sub option 1552.

As an example, as shown in FIG. 7, if the cursor 1560 of the input device selects the first main option 1542, which arranges the icons 1522 of the menu bar 1520 to arrange a first letter of a text string in the order of the Korean alphabet, among the plurality of main options 1540, the first sub option 1552 for categorizing the first main option 1542 in detail to allow a first letter of a text string to be listed in Korean consonants may be displayed.

If the cursor 1560 of the input device selects a consonant 'ㅂ' from the first sub option 1552 for categorizing the first main option 1542 in detail to allow a first letter of a text string to be listed in Korean consonants, the arrangement order of the icons 1522 of the menu bar 1520 may be changed by using the icon having a title starting from the consonant 'ㅂ' as a priority.

Figure 8:
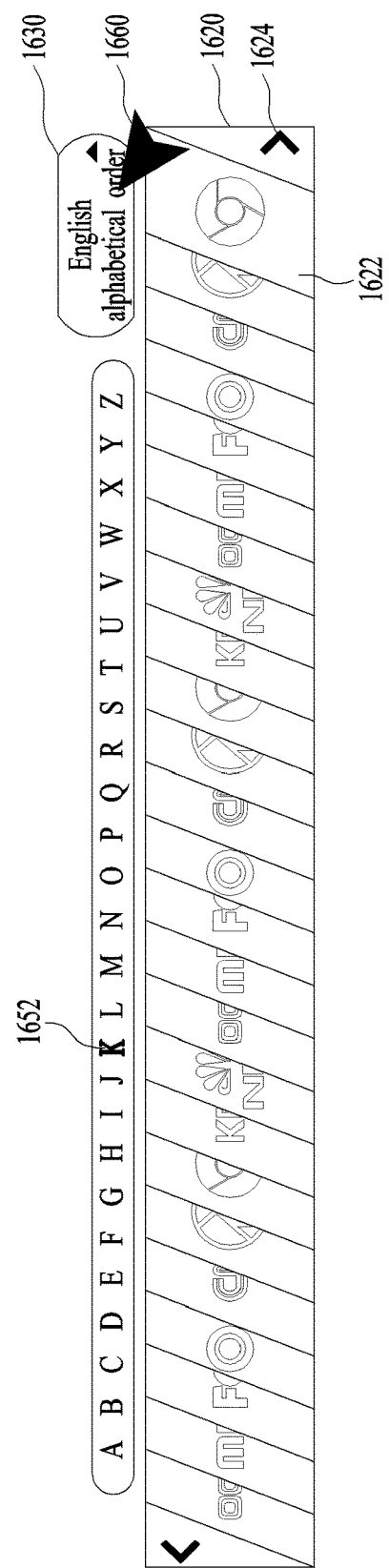

As another example, as shown in FIG. 8, if the cursor 1660 of the input device selects the second main option 1630, which arranges the icons 1622 of the menu bar 1620 to arrange a first letter of a text string in the order of the English alphabet, among the plurality of main options, the second sub option 1652 for categorizing the second main option 1630 in detail to allow a first letter of a text string to be listed in alphabet capitals or small letters may be displayed.

If the cursor 1660 of the input device selects a capital 'K' from the second sub option 1630 for categorizing the second main option 1630 in detail to allow a first letter of a text string to be listed in alphabet capitals, the arrangement order of the icons 1622 of the menu bar 1620 may be changed by using the icon having a title starting from the capital 'K' as a priority.

Figure 9:
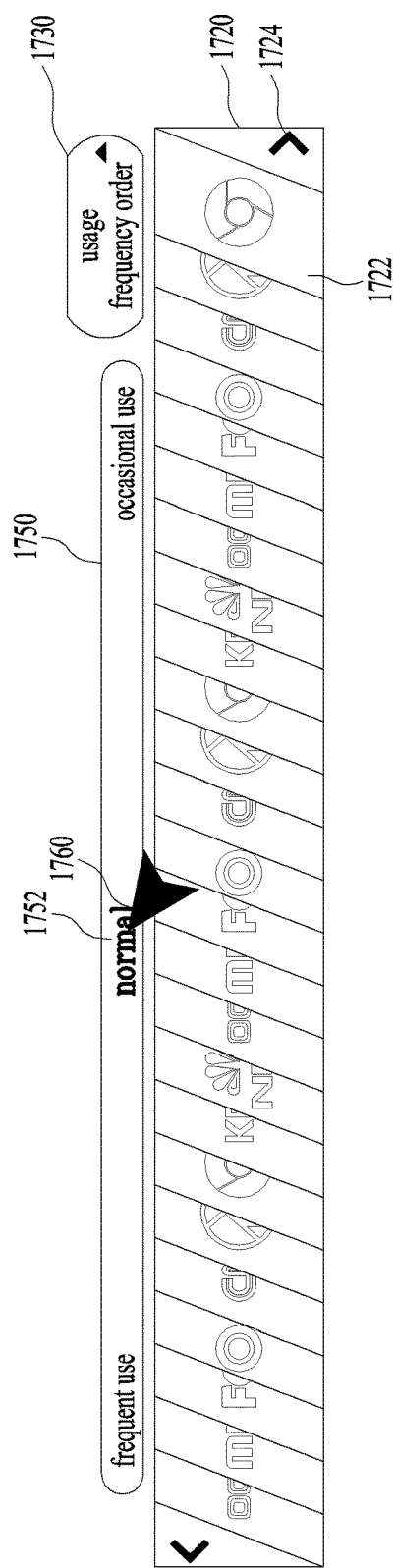

As still another example, as shown in FIG. 9, if the cursor 1760 of the input device selects the third main option 1730, which arranges the icons 1722 of the menu bar 1720 in the order of usage frequency, among the plurality of main options, the third sub option 1752 for categorizing the third main option 1730 into usage frequency in detail may be displayed.

If the cursor 1760 of the input device selects usage frequency 'normal' from the third sub option 1752 for categorizing the third main option 1730 into usage frequency in detail, the arrangement order of the icons 1722 of the menu bar 1720 may be changed by using the icon having usage frequency 'normal' as a priority.

Figure 10:
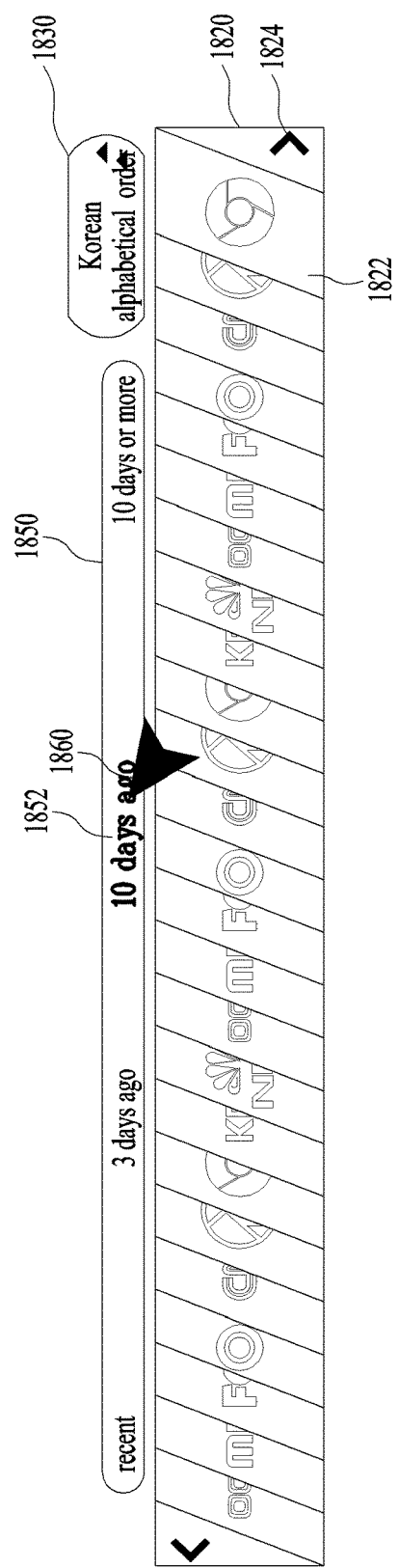

As further still another example, as shown in FIG. 10, if the cursor 1860 of the input device selects the fourth main option 1830, which arranges the icons 1822 of the menu bar 1820 in the order of recent usage, among the plurality of main options, the fourth sub option 1852 for categorizing the fourth main option 1830 into recent usage time in detail may be displayed.

If the cursor 1860 of the input device selects usage time '10 days ago' from the fourth sub option 1852 for categorizing the fourth main option 1830 into recent usage time in detail, the arrangement order of the icons 1822 of the menu bar 1820 may be changed by using the icon having usage time '10 days ago' as a priority.

Figure 11:
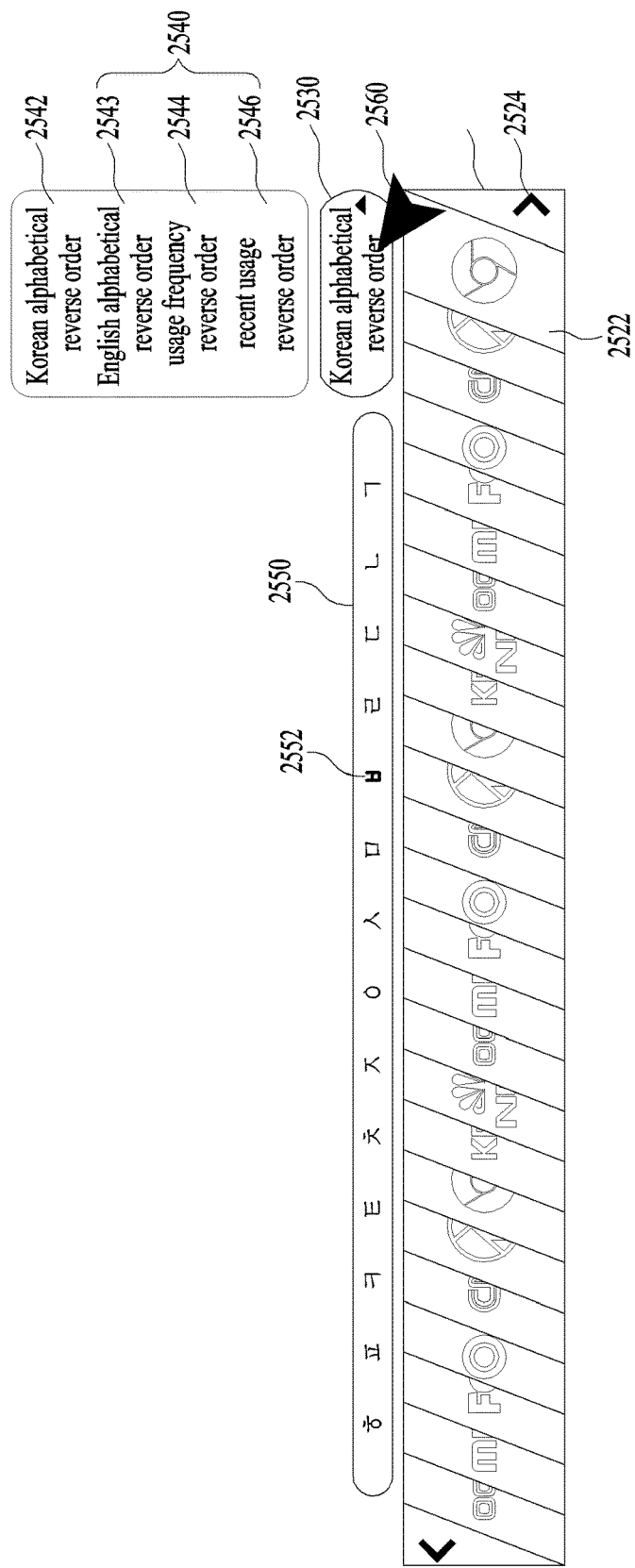

Also, for example, as shown in FIG. 11, the plurality of main options 2540 may include, but not limited to, a fifth main option 2542 for arranging the icons 2522 of the menu bar 2520 to allow a first letter of a text string to be listed in the reverse order of the Korean alphabet, a sixth main option 2543 for arranging the icons 2522 of the menu bar 2520 to allow a first letter of a text string to be listed in the reverse order of the English alphabet, a seventh main option 2544 for arranging the icons 2522 of the menu bar 2520 in the reverse order of usage frequency, and an eighth main option 2546 for arranging the icons 2522 of the menu bar 2520 in the reverse order of recent usage.

The sub option 2552 may include a fifth sub option for categorizing the fifth main option 2542 in detail to allow a first letter of a text string to be listed in the reverse order of Korean consonants, a sixth sub option for categorizing the sixth main option 2543 in detail to allow a first letter of a text string to be listed in the reverse order of alphabet capitals or small letters, a seventh sub option for categorizing the seventh main option 2544 into the reverse order of usage frequency in detail, and an eighth sub option for categorizing the eighth main option 2546 into the reverse order of recent usage time in detail.

As an example, as shown in FIG. 11, if the cursor 2560 of the input device selects the fifth main option 2542, which arranges the icons 2522 of the menu bar 2520 to arrange a first letter of a text string in the reverse order of the Korean alphabet, among the plurality of main options 2540, the fifth sub option 2552 for categorizing the fifth main option 2542 in detail to allow a first letter of a text string to be listed in the reverse order of Korean consonants may be displayed.

If the cursor 2560 of the input device selects a consonant 'ㅂ' from the fifth sub option 2552 for categorizing the fifth main option 2542 in detail to allow a first letter of a text string to be listed in the reverse order of Korean consonants, the arrangement order of the icons 2522 of the menu bar 2520 may be changed by using the icon having a title starting from the consonant 'ㅂ' as a priority.

Figure 12:
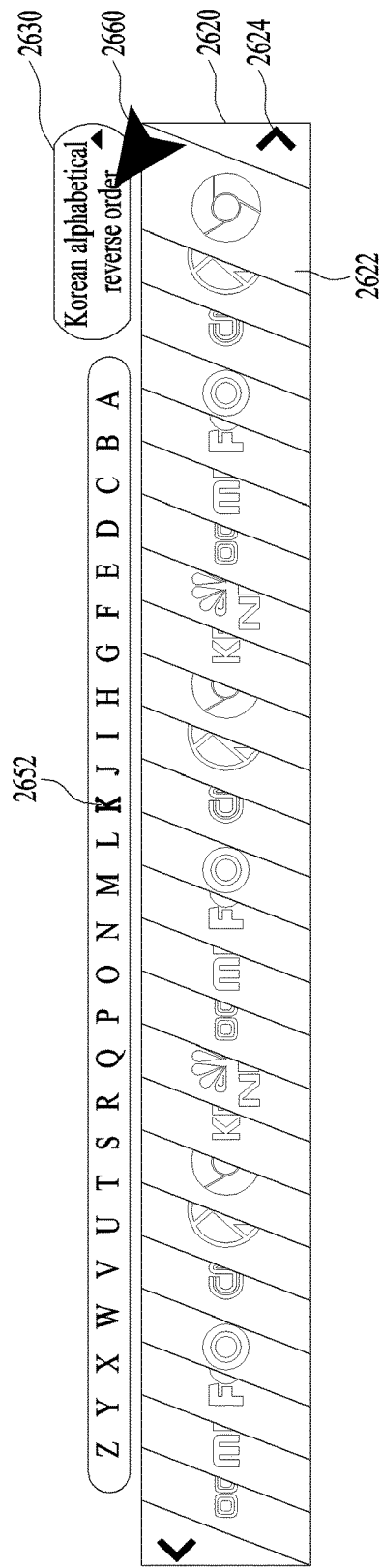

As another example, as shown in FIG. 12, if the cursor 2660 of the input device selects the sixth main option 2630, which arranges the icons 2622 of the menu bar 2620 to arrange a first letter of a text string in the reverse order of the English alphabet, among the plurality of main options, the sixth sub option 2652 for categorizing the sixth main option 2630 in detail to allow a first letter of a text string to be listed in the reverse order of alphabet capitals or small letters may be displayed.

If the cursor 2660 of the input device selects a capital 'K' from the sixth sub option 2630 for categorizing the sixth main option 2630 in detail to allow a first letter of a text string to be listed in the reverse order of alphabet capitals, the arrangement order of the icons 2622 of the menu bar 2620 may be changed by using the icon having a title starting from the capital 'K' as a priority.

Figure 13:
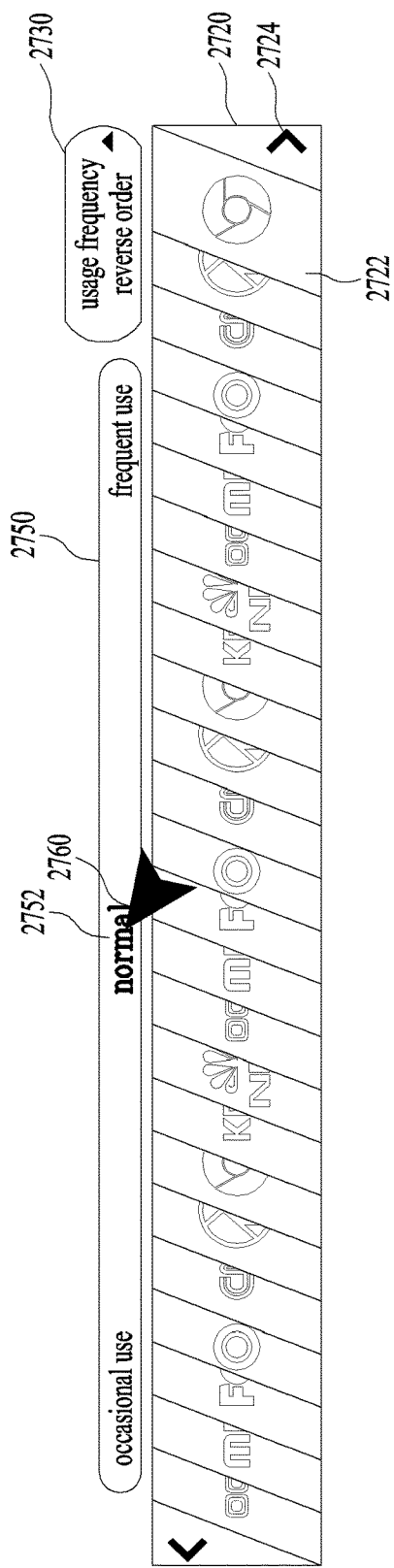

As still another example, as shown in FIG. 13, if the cursor 2760 of the input device selects the seventh main option 2730, which arranges the icons 2722 of the menu bar 2720 in the reverse order of usage frequency, among the plurality of main options, the seventh sub option 2752 for categorizing the seventh main option 2730 into the reverse order of usage frequency in detail may be displayed.

If the cursor 2760 of the input device selects usage frequency 'normal' from the seventh sub option 2752 for categorizing the seventh main option 2730 into the reverse order of usage frequency in detail, the arrangement order of the icons 2722 of the menu bar 2720 may be changed by using the icon having usage frequency 'normal' as a priority.

Figure 14:
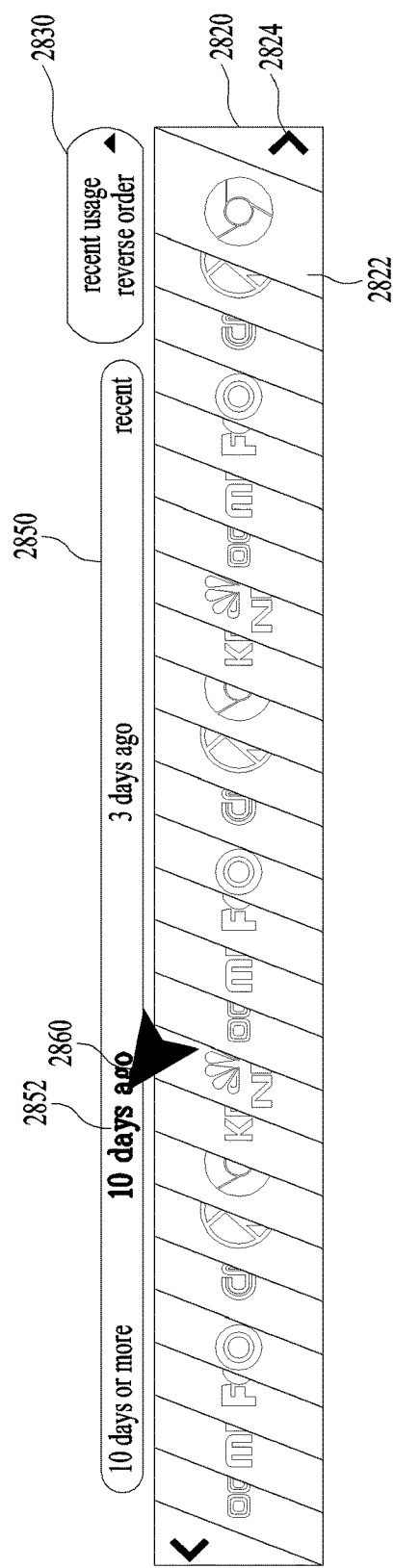

As further still another example, as shown in FIG. 14, if the cursor 2860 of the input device selects the eighth main option 2830, which arranges the icons 2822 of the menu bar 2820 in the reverse order of recent usage, among the plurality of main options, the eighth sub option 2852 for categorizing the eighth main option 2830 into the reverse order of recent usage time in detail may be displayed.

If the cursor 2860 of the input device selects usage time '10 days ago' from the eighth sub option 2852 for categorizing the eighth main option 2830 into the reverse order of recent usage time in detail, the arrangement order of the icons 2822 of the menu bar 2820 may be changed by using the icon having usage time '10 days ago' as a priority.

Therefore, the user may change the arrangement order of the menu bar easily and conveniently.

Figure 15:
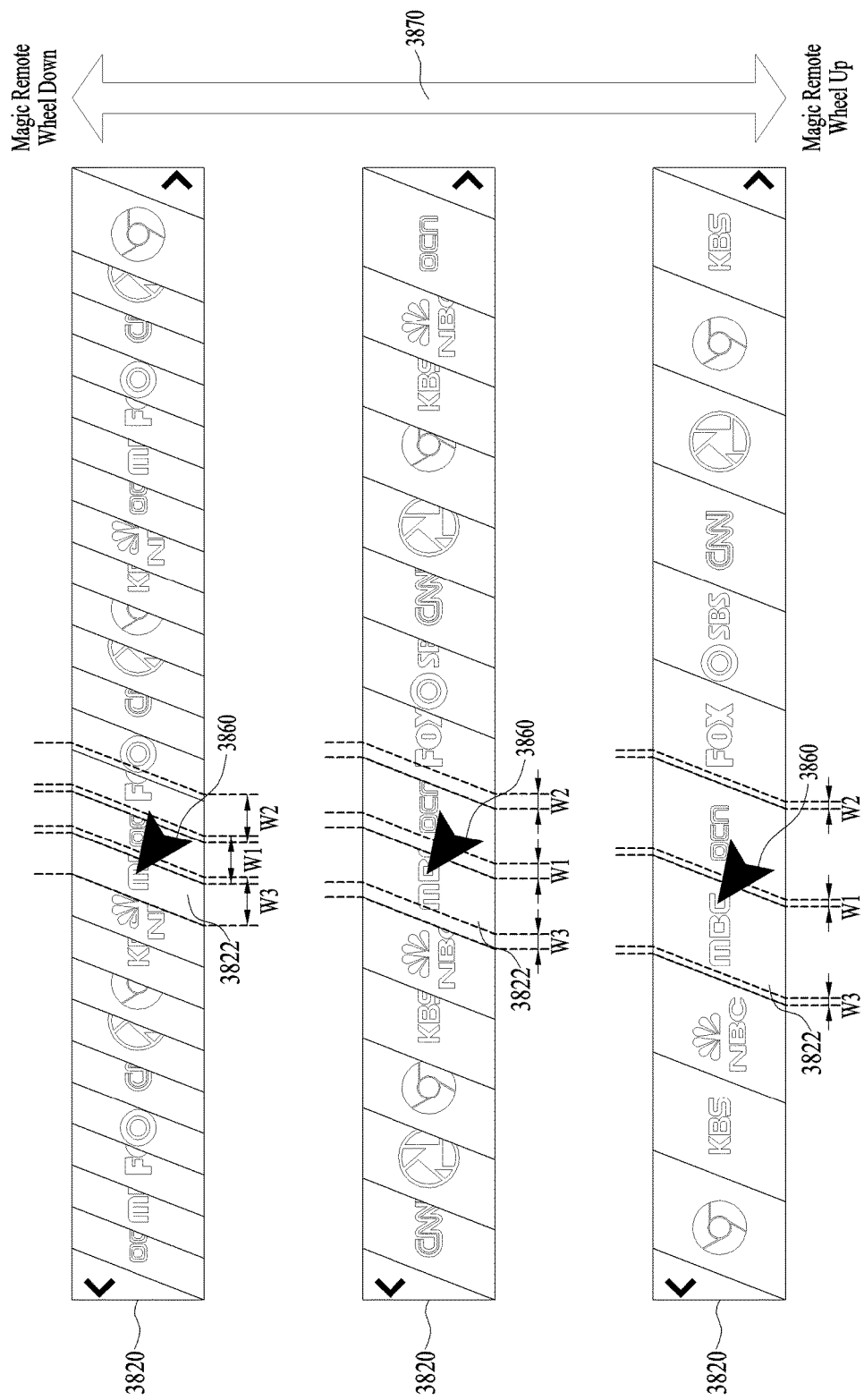
FIGS. 15 to 17 are diagrams illustrating a method for changing an arrangement width of icons included in a menu bar of FIG. 6.
Figure 16:
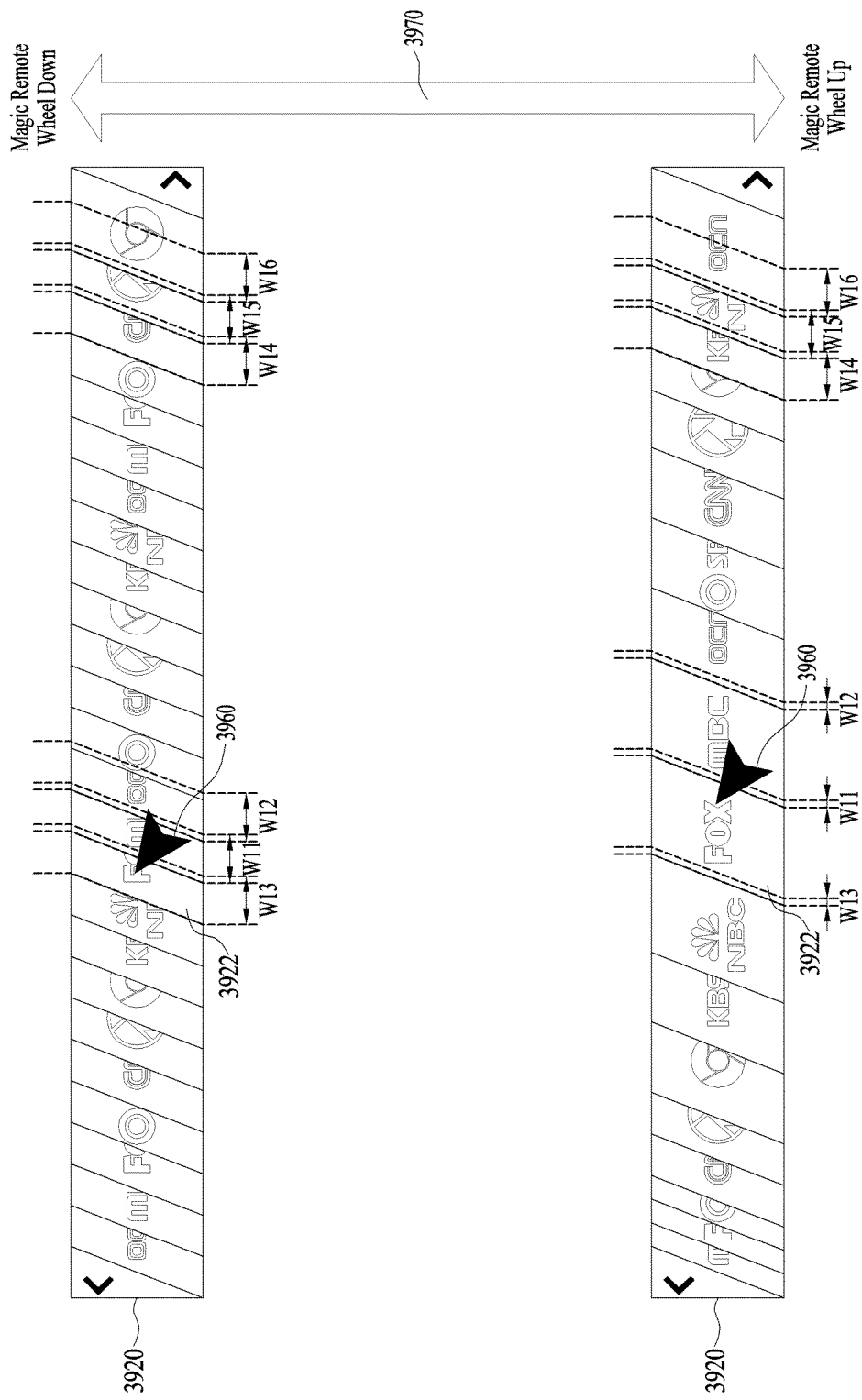
Figure 17:
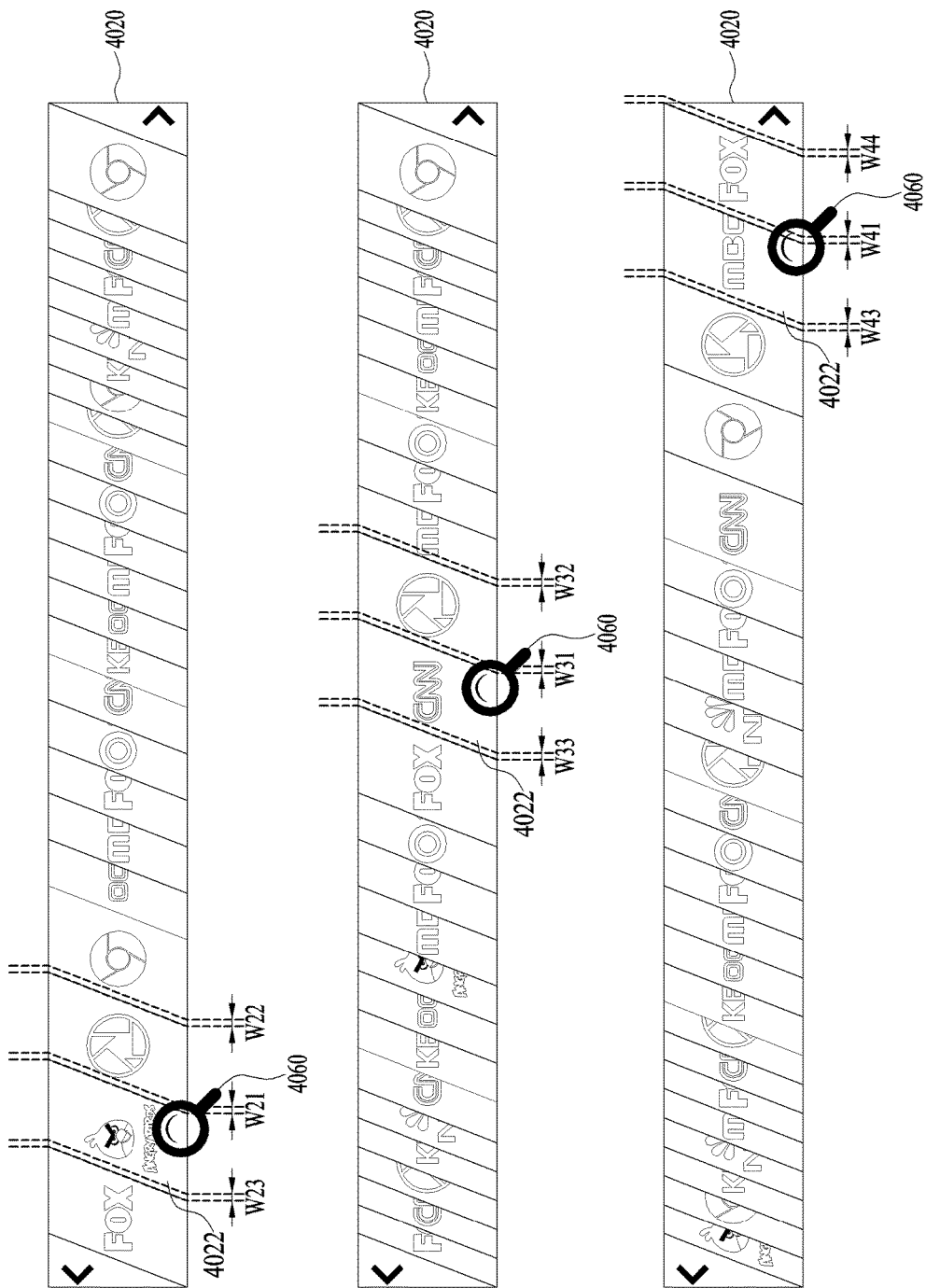

FIGS. 15 to 17 are diagrams illustrating a method for changing an arrangement width of icons included in a menu bar of FIG. 6.

As shown in FIG. 15, the controller controls the display unit to display the menu bar 3820 on the screen, wherein the menu bar 3820 may include a plurality of icons 3822 arranged in one direction, and the icons 3822 adjacent to each other may be displayed to be partially overlapped.

In this case, the controller may control the display unit to display the icons 3822 by overlapping some areas of the icons 3822 adjacent to each other if the number of the icons 3822 included in the menu bar 3820 is a predetermined reference number or more.

If the cursor 3860 of the input device is arranged on some areas of the menu bar 3820, the controller may increase or decrease overlap widths of the icons 3822 in a left and right direction under the control of the input device.

For example, if the cursor 3860 of the input device is arranged on some area of the menu bar 3820 and a wheel of the input device is rotated, the controller may increase or decrease overlap widths of the icons 3822 in a left and right direction in accordance with a rotation direction 3870 of the wheel.

For example, if the cursor 3860 of the input device is arranged on some area of the menu bar 3820 and the wheel of the input device is rotated upwardly, the controller may decrease overlap widths W1, W2 and W3 of the icons 3822 in a left and right direction.

In this case, the exposed areas of the icons 3822 may be more increased as the overlap widths W1, W2 and W3 of the icons 3822 are decreased in a left and right direction.

Also, if the cursor 3860 of the input device is arranged on some area of the menu bar 3820 and the wheel of the input device is rotated downwardly, the controller may increase the overlap widths W1, W2 and W3 of the icons 3822 in a left and right direction.

In this case, the exposed areas of the icons 3822 may be more decreased as the overlap widths W1, W2 and W3 of the icons 3822 are increased in a left and right direction.

At this time, when increasing or decreasing the overlap widths W1, W2 and W3 of the icons 3822 in a left and right direction, the controller may equally increase or decrease the overlap widths W1, W2 and W3 of all the icons 3822 included in the menu bar 3820.

As the case may be, as shown in FIG. 16, if the cursor 3960 of the input device is arranged on some area of the menu bar 3920 and the wheel of the input device is rotated, the controller may increase or decrease overlap widths of the icons 3922 in a left and right direction in accordance with the rotation direction of the wheel.

For example, if the cursor 3960 of the input device is arranged on some area of the menu bar 3920 and the wheel of the input device is rotated upwardly, the controller may decrease overlap widths W11, W12 and W13 of the icons 3922 in a left and right direction.

In this case, the exposed areas of the icons 3922 may be more increased as the overlap widths W11, W12 and W13 of the icons 3922 are decreased in a left and right direction.

Also, if the cursor 3960 of the input device is arranged on some area of the menu bar 3920 and the wheel of the input device is rotated downwardly, the controller may increase the overlap widths W11, W12 and W13 of the icons 3922 in a left and right direction.

In this case, the exposed areas of the icons 3922 may be more decreased as the overlap widths W11, W12 and W13 of the icons 3922 are increased in a left and right direction.

At this time, when increasing or decreasing the overlap widths W11, W12 and W13 of the icons 3922 in a left and right direction, the controller may increase or decrease only overlap widths W11, W12 and W13 of some icons 3922 adjacent to a point where the cursor 3960 of the input device is arranged, and may not increase or decrease overlap widths W14, W15 and W15 of some icons 3922 far away from the point where the cursor 3960 of the input device is arranged.

As another case, as shown in FIG. 17, if the cursor 3960 of the input device is arranged on some area of the menu bar 3920 and the wheel of the input device is rotated downwardly, the controller may increase the overlap widths W11, W12 and W13 of the icons 3922 in a left and right direction.

For example, if a zooming pointer 4060 of the input device is arranged on a left edge area of the menu bar 4020, the controller may decrease overlap widths W21, W22 and W23 of some icons 4022 adjacent to the left edge area where the zooming pointer 4060 of the input device is arranged.

In this case, the exposed areas of the icons 4022 may be more increased as the overlap widths W21, W22 and W23 of the icons 4022 are decreased in a left and right direction.

Also, if the zooming pointer 4060 of the input device is arranged on a center area of the menu bar 4020, the controller may decrease overlap widths W31, W32 and W33 of some icons 4022 adjacent to the center area where the zooming pointer 4060 of the input device is arranged.

In this case, the exposed areas of the icons 4022 may be more increased as the overlap widths W31, W32 and W33 of the icons 4022 are decreased in a left and right direction.

Subsequently, if the zooming pointer 4060 of the input device is arranged on a right edge area of the menu bar 4020, the controller may decrease overlap widths W41, W42 and W43 of some icons 4022 adjacent to the right edge area where the zooming pointer 4060 of the input device is arranged.

In this case, the exposed areas of the icons 4022 may be more increased as the overlap widths W41, W42 and W43 of the icons 4022 are decreased in a left and right direction.

Therefore, the user may acquire more exposed areas of some icons from the plurality of icons included in the menu bar by decreasing the overlap widths of some icons, whereby the user may discover a desired icon easily and conveniently.

Figure 18:
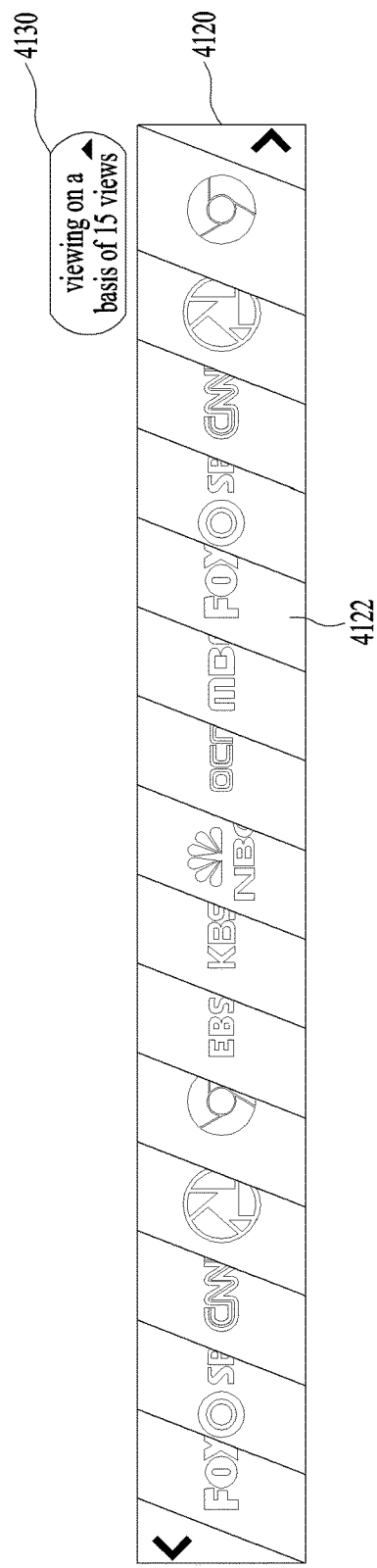
FIGS. 18 and 19 are diagrams illustrating a method for changing the number of icons included in a menu bar of FIG. 6.
Figure 19:
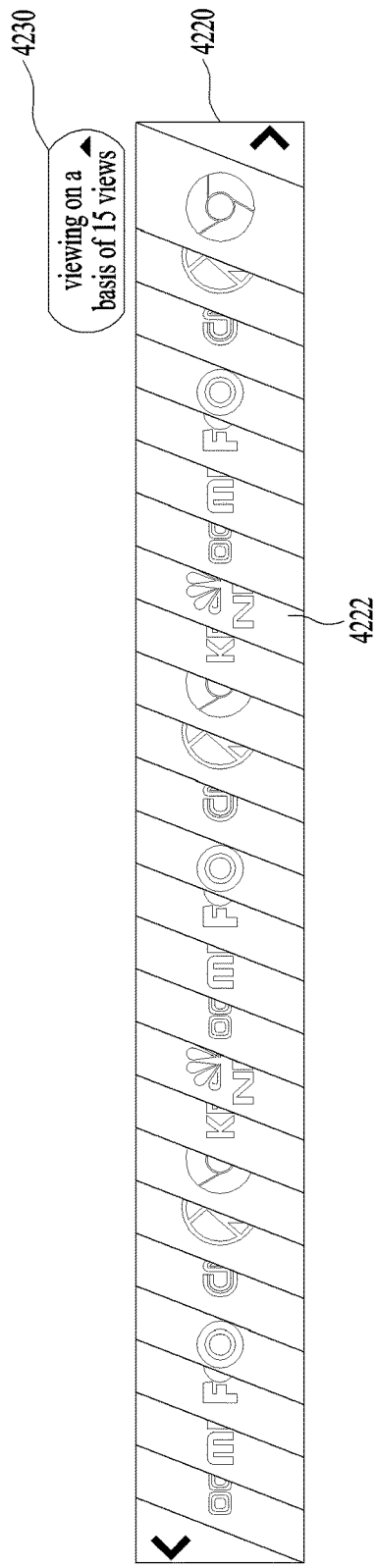

FIGS. 18 and 19 are diagrams illustrating a method for changing the number of icons included in a menu bar of FIG. 6.

As shown in FIG. 18, the controller controls the display unit to display the menu bar 4120 on the screen, wherein the menu bar 4120 may include a plurality of icons 4122 arranged in one direction, and the icons 4122 adjacent to each other may be displayed to be partially overlapped.

In this case, the controller may control the display unit to display the icons 4122 by overlapping some areas of the icons 4122 adjacent to each other if the number of the icons 4122 included in the menu bar 4120 is a predetermined reference number or more.

A viewing option UI button 4130, which includes a plurality of viewing options for setting the number of the icons 4122 displayed in an area of the menu bar 4120, may be arranged in the periphery of the menu bar 4120.

In this case, if the cursor of the input device selects a viewing option, the controller may change the number of the icons 4122 displayed in an area of the menu bar 4120, in accordance with the selected viewing option.

For example, as shown in FIG. 18, if the cursor of the input device selects a viewing option on a basis of 15 views among the viewing options, the controller may change the number of the icons 4122 displayed in an area of the menu bar 4120 to 15 in accordance with the selected viewing option.

Also, as shown in FIG. 19, if the cursor of the input device selects a full-viewing option among the viewing options, the controller may change the number of the icons 4122 displayed in an area of the menu bar 4120 to a full number in accordance with the selected viewing option.

Therefore, the user may easily and conveniently change the number of icons that may be included in the menu bar.

Figure 20:
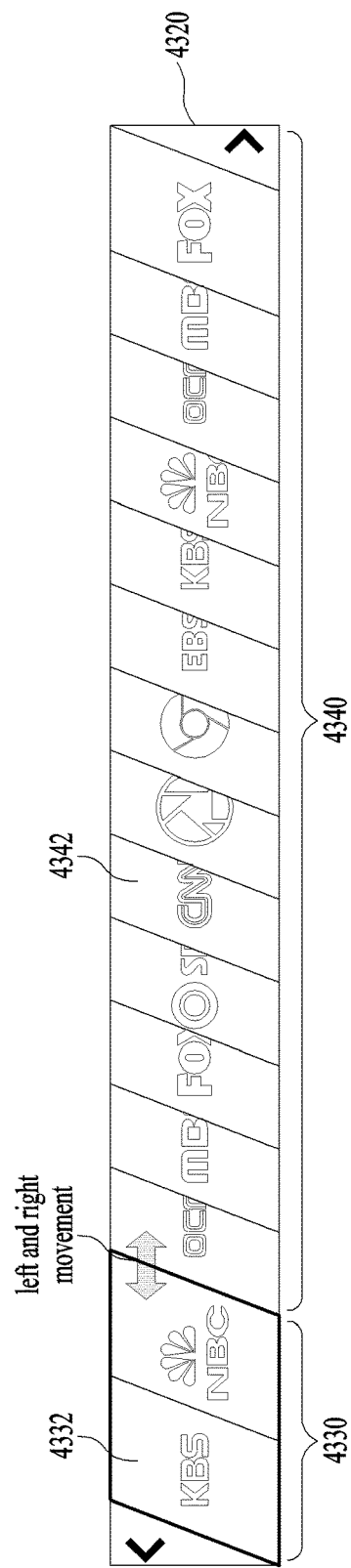
FIGS. 20 and 21 are diagrams illustrating a method for partially fixing icons included in a menu bar of FIG. 6.
Figure 21:
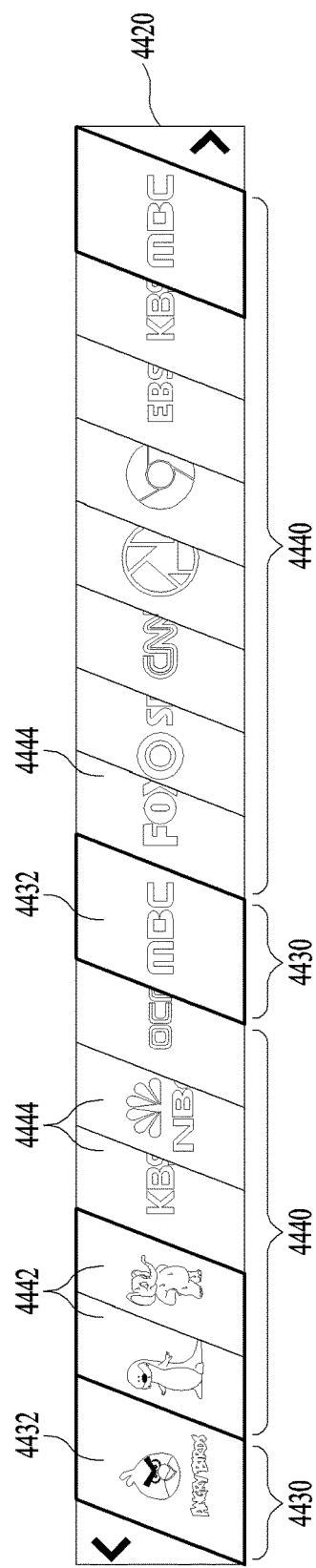

FIGS. 20 and 21 are diagrams illustrating a method for partially fixing icons included in a menu bar of FIG. 6.

As shown in FIG. 20, the controller controls the display unit to display the menu bar 4320 on the screen, wherein the menu bar 4320 may include a plurality of icons 4322 arranged in one direction, and the icons 4322 adjacent to each other may be displayed to be partially overlapped.

In this case, the controller may control the display unit to display the icons 4322 by overlapping some areas of the icons 4322 adjacent to each other if the number of the icons 4322 included in the menu bar 4320 is a predetermined reference number or more.

The controller may divide the menu bar 4320 into a fixed area 4330 and a variable area 4340, and may fix a position and an overlap width of at least one icon 4332 included in the fixed area 4330 and vary a position and an overlap width of at least one icon 4342 included in the variable area 4340.

Also, the controller may vary the number of icons 4332 included in the fixed area 4330 by increasing and decreasing the fixed area 4330 of the menu bar 4320.

For example, the controller may set the fixed area 4330 by fixing at least one icon included in the menu bar 4320 using a fixing frame, and may divide the menu bar 4320 into the fixed area 4330 and the variable area 4340 depending on the presence of the fixing frame.

In this case, the fixing frame may be formed to surround the periphery of at least one icon included in the fixed area 4330.

Also, the controller may increase and decrease the fixed area 4330 of the menu bar 4320 by displaying the fixing frame around the fixed area 4330 of the menu bar 4320 and moving the fixing frame in a left and right direction using the cursor of the input device.

Therefore, the number of icons 4332 included in the fixing frame may be varied depending on the size of the fixing frame.

As the case may be, the fixing frame may be highlighted to allow the user to easily view it.

Subsequently, as shown in FIG. 21, if icons 4442 related to the icon 4432 included in the fixed area 4430 exist within the variable area 4440 of the menu bar 4420, the controller may arrange the icons 4442 to adjoin the fixed area 4430 of the menu bar 4420.

For example, if the icon 4432 included in the fixed area 4430 of the menu bar 4420 is related to the icons 4442 related to game and the icons 4442 related to game exist within the variable area 4440 of the menu bar 4420, the controller may align the icons 4442 of the variable area 4440 to adjoin one side of the fixed area 4430.

In this case, the icons 4442 of the variable area 4440, which are related to game and adjoin one side of the fixed area 4430, may be highlighted to allow the user to easily view them.

Also, the controller may set a plurality of fixed areas 4430 of the menu bar 4420.

In this case, the variable area 4440, which includes at least one icon 4444, may be arranged between the fixed areas 4430.

That is, when the plurality of fixed areas 4430 of the menu bar 4420 are provided, the fixed areas 4430 may be arranged to be spaced apart from each other at a certain interval.

In this way, if the menu bar 4320 is divided into the fixed area 4330 and the variable area 4340, the position and the overlap width of at least one icon 4332 included in the fixed area 4330 are fixed, whereas the position and the overlap width of at least one icon 4342 included in the variable area 4340 may be varied.

Therefore, the user may easily and conveniently fix the icon which is not desired to be varied.

Figure 22:
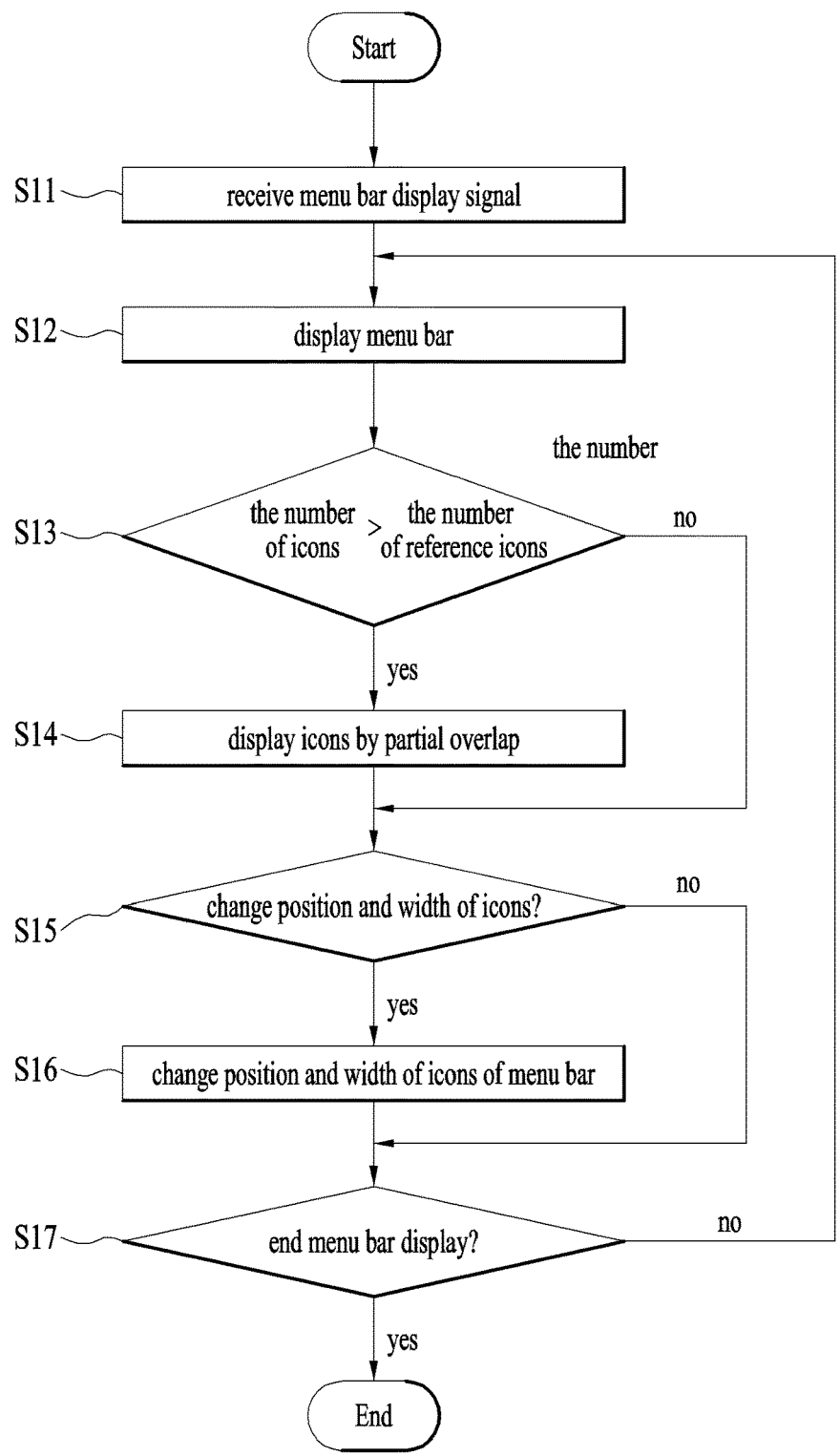
FIG. 22 is a flow chart illustrating a procedure of changing a position and overlap width of icons of a menu bar in a multimedia device according to one embodiment of the present invention.

FIG. 22 is a flow chart illustrating a procedure of changing a position and overlap width of icons of a menu bar in a multimedia device according to one embodiment of the present invention.

As shown in FIG. 22, the controller of the multimedia device may receive a menu bar display signal (S11), and may display the menu bar on the screen of the display unit in accordance with the received menu bar display signal (S12).

In this case, the controller may automatically output the menu bar to the screen of the display unit after logging in to account of a specific user, or may output the menu bar to the screen of the display unit if a predetermined signal for paging the menu bar is received from a remote controller after logging in to the account of the specific user.

Therefore, the step of receiving the menu bar display signal may be omitted as the case may be.

Next, the controller identifies whether the number of icons included in the menu bar is a predetermined reference number or more (S13), and as a result, if the number of icons is a predetermined reference number or more, the controller may display the icons by partially overlapping the icons adjacent to each other.

In this case, the overlap area of the icons adjacent to each other may be varied depending on the number of icons included in the menu bar.

For example, if the number of icons included in the menu bar is increased, the overlap area of the icons adjacent to each other may be increased, and if the number of icons included in the menu bar is decreased, the overlap area of the icons adjacent to each other may be decreased.

Also, if all the icons included in the menu bar cannot be displayed on one screen or the menu bar includes a plurality of pages, the menu bar may further include an indicator for identifying the icons which are not displayed on one screen and/or the icons displayed on different pages.

Subsequently, the controller identifies whether there is a change request of at least one of the position and the overlap width of the icons included in the menu bar (S15). As a result, if there is a change request, the controller may change the position and/or the overlap width of the icons included in the menu bar in accordance with the change request (S16).

For example, if any one of a plurality of main options is selected, the controller may display a sub option corresponding to the selected main option, and if the sub option is selected, the controller may change an arrangement order of the icons of the menu bar in accordance with the selected sub option.

If a cursor of an input device is arranged on some area of the menu bar and a wheel of the input device is rotated, the controller may increase or decrease the overlap width of the icons in a left and right direction in accordance with the rotation direction of the wheel.

As the case may be, if a zooming pointer of the input device is arranged on some area of the menu bar, the controller may increase or decrease the overlap width of the icons adjacent to a point where the zooming pointer is arranged.

As another case, if the cursor of the input device selects a viewing option, the controller may change the number of icons displayed in an area of the menu bar in accordance with the selected viewing option.

As still another case, the controller may divide the menu bar into a fixed area and a variable area, and may fix the position and the overlap width of at least one icon included in the fixed area and vary the position and the overlap width of at least one icon included in the variable area.

Finally, the controller identifies whether a display of the menu bar ends (S17), and as a result, if the display of the menu bar ends, the controller may end the display of the menu bar.

As described above, according to the present invention, since the menu bar, which includes a plurality of icons, may be provided and the arrangement order, position and overlap width of the icons may be varied, convenience may be provided to the user.

Also, a user environment for allowing the user to easily access functions of the multimedia device may be provided.

MODE FOR CARRYING OUT THE INVENTION

The multimedia device and the control method therefor disclosed in this specification are not limited to the aforementioned embodiments, and all or some of the aforementioned embodiments may selectively be configured in combination so that various modifications may be made in the aforementioned embodiments.

Meanwhile, the control method of the multimedia device disclosed in this specification may be implemented in a recording medium, which may be read by a processor provided in the multimedia device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a shape of carrier wave such as transmission through Internet. Also, the recording medium that can be read by the processor may be distributed in a computer system connected thereto through a network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

INDUSTRIAL APPLICABILITY

The present invention relates to a multimedia device and a control method therefor, in which convenience may be provided to a user. Therefore, the present invention has industrial applicability.

The invention claimed is:
1. A multimedia device comprising:
a display unit; and
a controller for controlling the display unit to display a menu bar on a screen, wherein the menu bar includes a plurality of icons arranged in one direction, and the icons adjacent to each other are displayed while partially overlapping each other,
wherein a main option UI button, which includes a plurality of main options for setting an arrangement order of the icons of the menu bar, is arranged in the periphery of the menu bar, the plurality of main options including a first main option for arranging the icons of the menu bar to allow a first letter of a text string to be listed in the order of the Korean alphabet or English alphabet, a second main option for arranging the icons of the menu bar in the order of usage frequency, and a third main option for arranging the icons of the menu bar in the order of recent usage,
wherein a sub option UI button, which includes a sub option for categorizing the set main option in detail, is arranged in the periphery of the menu bar, the sub option including a first sub option for categorizing the first main option in detail to allow a first letter of a text string to be listed in Korean consonants or alphabet letters, a second sub option for categorizing the second main option into usage frequency in detail, and a third sub option for categorizing the third main option into recent usage time in detail, and
wherein, if a cursor of an input device selects the sub option, the controller changes the arrangement order of the icons of the menu bar in accordance with the selected sub option.
2. The multimedia device according to claim 1, wherein the controller controls the display unit to display the icons by partially overlapping the icons adjacent to each other if the number of icons included in the menu bar is a predetermined reference number or more.
3. The multimedia device according to claim 1, wherein the controller displays the plurality of main options to adjoin the main option UI button if a cursor of an input device is arranged in the main option UI button, and if any one of the plurality of main options is selected, the controller displays the sub option UI button that includes a sub option corresponding to the selected main option.
4. The multimedia device according to claim 1, wherein an indicator for scrolling the icons in a left and right direction is displayed at both ends of the menu bar.
5. The multimedia device according to claim 1, wherein the icons of the menu bar have a shape of App card for displaying emblem of an application to be executed.
6. The multimedia device according to claim 1, wherein the controller increases or decreases overlap widths of the icons under the control of the input device if the cursor of the input device is arranged on some area of the menu bar.

7. The multimedia device according to claim 6, wherein the controller equally increases or decreases the overlap widths of the icons included in the menu bar.

8. The multimedia device according to claim 6, wherein the controller increases or decreases overlap widths of some of the icons on the basis of a point where the cursor of the input device is arranged.

9. The multimedia device according to claim 1, wherein, if a zooming pointer of the input device is arranged on some area of the menu bar, the controller increases or decreases overlap widths of some of the icons on the basis of a point where the zooming pointer of the input device is arranged.

10. The multimedia device according to claim 1, wherein a viewing option UI button, which includes a plurality of viewing options for setting the number of icons displayed in an area of the menu bar, is arranged in the periphery of the menu bar, and if the cursor of the input device selects a viewing option, the controller changes the number of icons displayed in an area of the menu bar, in accordance with the selected viewing option.

11. The multimedia device according to claim 1, wherein the controller divides the menu bar into a fixed area and a variable area, and fixes a position and an overlap width of at least one icon included in the fixed area and varies a position and an overlap width of at least one icon included in the variable area.

12. The multimedia device according to claim 11, wherein the controller varies the number of icons included in the fixed area by increasing or decreasing the fixed area of the menu bar.

13. The multimedia device according to claim 11, wherein, if icons related to the icon included in the fixed area exist within the variable area of the menu bar, the controller arranges the related icons to adjoin the fixed area of the menu bar.

14. The multimedia device according to claim 11, wherein the controller sets a plurality of fixed areas of the menu bar, and the variable area, which includes at least one icon, is arranged between the fixed areas.

* * * * *